(12) United States Patent
Krunic et al.

(10) Patent No.: US 10,522,034 B2
(45) Date of Patent: Dec. 31, 2019

(54) GLARE DETECTION SYSTEM AND METHODS FOR AUTOMATED VEHICULAR CONTROL

(71) Applicant: Allstate Insurance Company, Northbrook, IL (US)

(72) Inventors: Veljko Krunic, Boulder, CO (US); Timothy W. Gibson, Barrington, IL (US); Sunil Chintakindi, Fremont, CA (US); Howard Hayes, Glencoe, IL (US)

(73) Assignee: Allstate Insurance Company, Northbrook, IL (US)

( * ) Notice: Subject to any disclaimer, the term of this patent is extended or adjusted under 35 U.S.C. 154(b) by 0 days.

(21) Appl. No.: 16/106,668

(22) Filed: Aug. 21, 2018

(65) Prior Publication Data

US 2019/0005817 A1   Jan. 3, 2019

Related U.S. Application Data

(63) Continuation of application No. 15/243,421, filed on Aug. 22, 2016, now Pat. No. 10,083,606.

(51) Int. Cl.
*G08G 1/0967* (2006.01)
*G01W 1/10* (2006.01)
(Continued)

(52) U.S. Cl.
CPC ........ *G08G 1/096775* (2013.01); *G01W 1/10* (2013.01); *G05D 1/0088* (2013.01);
(Continued)

(58) Field of Classification Search
CPC ....... G08G 1/096775; G08G 1/096838; G08G 1/096833; G05D 1/0214; G05D 1/0088; G01W 1/10
See application file for complete search history.

(56) References Cited

U.S. PATENT DOCUMENTS 9,760,090 B2 * 9/2017 Shashua ................ G01C 21/32
2002/0082771 A1 6/2002 Anderson
(Continued)

FOREIGN PATENT DOCUMENTS

WO    2010040386 A1   4/2010

OTHER PUBLICATIONS

May 19, 2017—U.S. Non-Final Office Action—U.S. Appl. No. 15/243,421.

(Continued)

*Primary Examiner* — Thomas Ingram
(74) *Attorney, Agent, or Firm* — Banner & Witcoff, Ltd.

(57) ABSTRACT

Aspects of the present disclosure describe systems, methods, and devices for automated vehicular control based on glare detected by an optical system of a vehicle. In some aspects, automated control includes controlling the operation of the vehicle itself, a vehicle subsystem, or a vehicle component based on a level of glare detected. According to some examples, controlling the operation of a vehicle includes instructing an automatically or manually operated vehicle to traverse a selected route based on levels of glare detected or expected along potentials routes to a destination. According to other examples, controlling operation of a vehicle subsystem or a vehicle component includes triggering automated responses by the subsystem or the component based on a level of glare detected or expected. In some additional aspects, glare data is shared between individual vehicles and with a remote data processing system for further analysis and action.

19 Claims, 7 Drawing Sheets

(51) Int. Cl.
  *G05D 1/02*   (2006.01)
  *G05D 1/00*   (2006.01)
  *G08G 1/0968* (2006.01)
  *G08G 1/01*   (2006.01)
  *G08G 1/09*   (2006.01)

(52) U.S. Cl.
  CPC ..... *G05D 1/0214* (2013.01); *G08G 1/096833* (2013.01); *G08G 1/096838* (2013.01)

(56) References Cited

U.S. PATENT DOCUMENTS

| | | |
|---|---|---|
| 2002/0128773 A1 | 9/2002 | Chowanic et al. |
| 2003/0066299 A1 | 4/2003 | Aoki |
| 2004/0098175 A1 | 5/2004 | Said et al. |
| 2004/0252193 A1 | 12/2004 | Higgins |
| 2006/0271286 A1 | 11/2006 | Rosenberg |
| 2008/0004802 A1 | 1/2008 | Horvitz |
| 2009/0043865 A1 | 2/2009 | Dumitru et al. |
| 2011/0060523 A1 | 3/2011 | Baron |
| 2011/0220091 A1 | 9/2011 | Kroyzer |
| 2011/0234626 A1 | 9/2011 | Seong et al. |
| 2012/0035887 A1 | 2/2012 | Augenbraun et al. |
| 2013/0218449 A1* | 8/2013 | Hymel ............... G01C 21/3461 701/408 |
| 2017/0010106 A1* | 1/2017 | Shashua ................ G01C 21/32 |
| 2017/0132334 A1 | 5/2017 | Levinson et al. |

OTHER PUBLICATIONS

Sep. 22, 2017—PCT International Search Report—PCT/US17/47884.
Nov. 3, 2017—U.S. Final Office Action—U.S. Appl. No. 15/243,421.
Mar. 29, 2018—U.S. Notice of Allowance—U.S. Appl. No. 15/243,421.
Apr. 23, 2018—U.S. Notice of Allowance—U.S. Appl. No. 15/243,421.

* cited by examiner

GLARE DETECTION SYSTEM AND METHODS FOR AUTOMATED VEHICULAR CONTROL

CROSS-REFERENCE TO RELATED APPLICATIONS

This application is a continuation of U.S. patent application Ser. No. 15/243,421, filed Aug. 22, 2016, which prior application is incorporated herein by reference in its entirety and made part hereof.

TECHNICAL FIELD

Various aspects of the disclosure generally relate to computerized vehicle controls and navigation. For example, aspects of the disclosure are directed to determining the control, monitoring, guidance, and condition for a vehicle as well as components and subsystems associated with the vehicle. In addition, aspects of the disclosure are directed to providing navigation information to an autonomous vehicle or a vehicle operator. Particular aspects of the disclosure are directed to controlling operation of a vehicle, its subsystems, and its components in response to glare detected by an optical system of the vehicle.

BACKGROUND

Encountering glare during the operation of a vehicle can greatly diminish visibility of the road and surrounding environment to the operator of the vehicle. This impairment increases the risk of accidents to both the vehicle encountering the glare and surrounding vehicles. Techniques for reducing the effect of glare may simply diminish glare as it encountered. Such techniques, however, do not predict or anticipate glare and take action in response.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Various aspects to improving vehicle operation by identifying and avoiding potential exposure to glare. Aspects of the disclosure relate to methods, computer-readable media, systems, and apparatuses for determining a glare factor based on real-time or near real-time navigational analysis using sensor data, digital image data, and a map database. In some arrangements, the system may be a glare factor system that includes at least one processor; and at least one memory storing computer-executable instructions that, when executed by the at least one processor, cause the glare detection system to perform glare analysis.

In some aspects the computing device may determine one or more real-time factors and real-time data associated with the one or more real-time factors. These factors may include weather, time of day, day of the week, traffic information, geographic information, vehicle information, surrounding structures, or additional factors that may influence exposure to glare. The collection and storing of real-time data will allow for the development of a portfolio of historical data that may be used in predictive analysis for determining an anticipated amount of glare along a route. In some aspects, the system may be a glare detection system that includes at least one processor, and at least one memory storing computer-executable instructions that, when executed by the at least one processor, cause the glare detection system to perform glare analysis.

In accordance with aspects of the disclosure, a sensor system may record, based on a vehicle traveling a segment of a road, the amount of glare which the operator of the vehicle would experience. In different aspects the operation of the vehicle may be manual by a user, fully automated by a control system, or at least partially automated such that certain subsystems or controls are automatic. A sensor system may also record, based on a vehicle traveling a segment of a road, environmental data that influences exposure to glare. The glare data and environmental data may be communicated to a server where it may be stored and/or analyzed. In some aspects, the server may receive current environmental data from a network, a vehicle, a server, or other source, and may perform analysis comparing the current environmental data to the stored historical data to predict an anticipated amount of glare.

In at least some aspects, a system may analyze sensor data, real-time environmental data, and a map database in order to create a glare factor map. In different aspects this glare factor map may be based on historical data, current data, or a combination of both. In some aspects the system may use the glare factor map to generate recommended route segment combinations for a vehicle traveling to a destination to reduce exposure to glare. In different aspects the vehicle may be manually operated or autonomously operated.

In some aspects the system may receive predefined navigational data from a map database system in order to determine potential route segment combinations. The system may analyze glare data to generate a glare factor map assigning glare data to individual route segments. In some aspects a vehicle will communicate a starting point and a destination to the system. The system may analyze the glare factors associated with routes between the starting point and destination to determine a recommended route. In some aspects, at least one of the route segments may be recalculated in response to an update to the real-time data. The system may communicate the recommended route to the vehicle where it may be displayed to a user or received at an autonomous control system.

Other features and advantages of the disclosure will be apparent from the additional description provided herein.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein.

DETAILED DESCRIPTION

Figure 1:
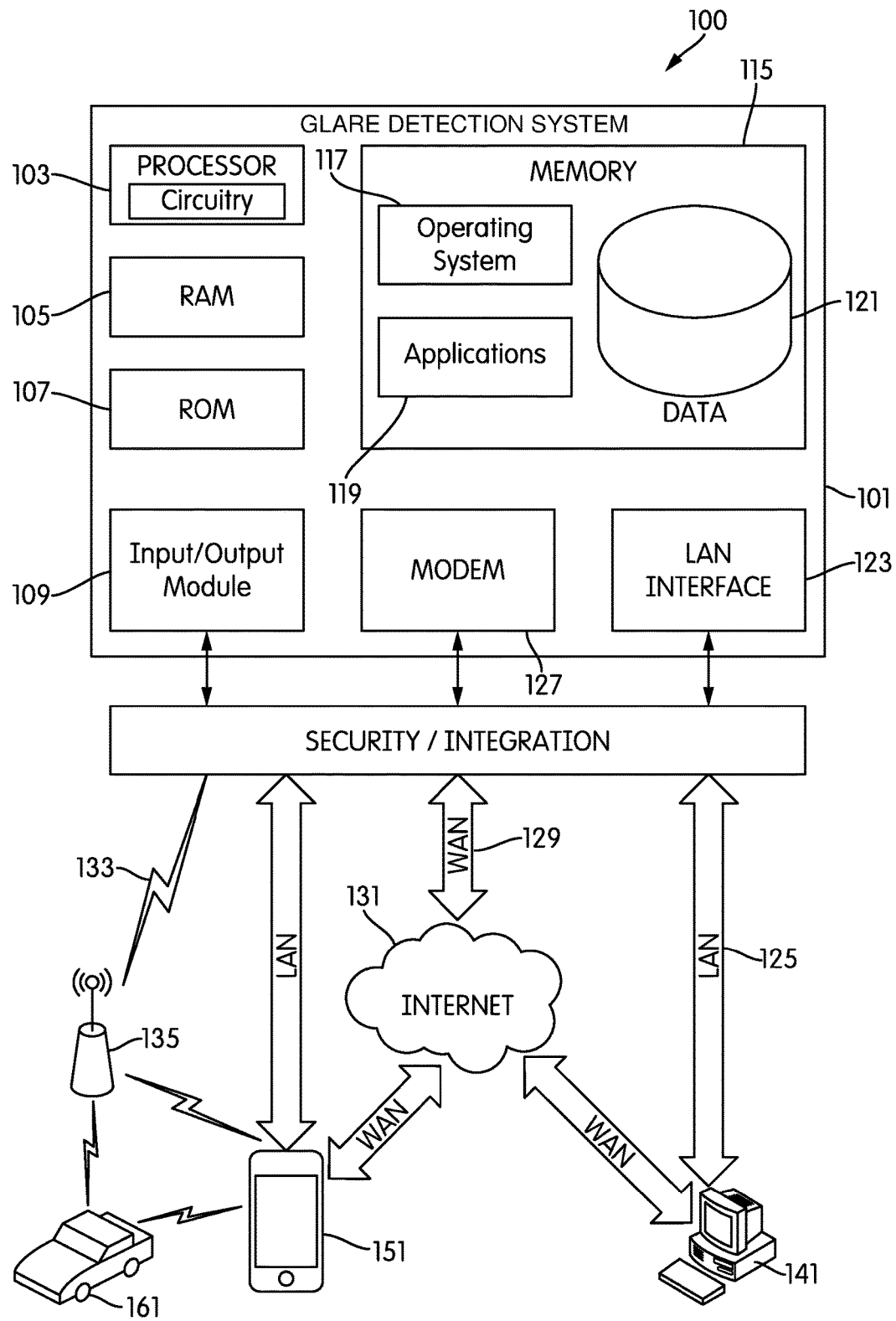
FIG. 1 illustrates a network environment and computing systems that may be used to implement aspects of the disclosure.

In the following description of the various embodiments, reference is made to the accompanying drawings, which form a part hereof, and in which is shown by way of illustration, various embodiments of the disclosure that may be practiced. It is to be understood that other embodiments may be utilized.

Aspects of the present disclosure are directed to the detection and measurement of glare along route segments in order to determine an anticipated amount of glare when subsequently traversing those route segments. The techniques described in further detail below permit both automated and manually operated vehicles to make route decisions to reduce glare exposure and minimize one of the more prevalent hazards to vehicle operation.

Throughout this disclosure reference is made to glare, glare detection, glare data, and glare factor. The use of these terms should not limit the disclosure to any particular definition. Glare may generally be considered the impairment of visibility caused by the presence of a light. More particularly, glare may be caused by the ratio of luminance between an object being looked at and a light source. In some cases glare may be caused by sunlight, direct or reflected, stars or moonlight, or artificial light, such as cars headlamps, street lights, street signs, building lights, etc. The effect of glare on a person's vision may depend on a variety of factors, such as the angle or distance between the viewer and the object being looked at, the light source causing glare, additional light sources, weather, duration of glare (as vision may adapt over time), and additional factors. Glare may reduce visibility by constricting the pupils, scattering light within the eye or air, reducing or increasing contrast between objects, causing discomfort to an observer causing them to look away, and other means. Glare may be measured in different units, but is often measured as the luminance of objects within a small solid angle, such as a visual field of view. This disclosure does not intend to limit the units, procedure, process, device, system, method, or manner in which glare is detected, measured, or calculated.

Various techniques may be selectively employed to measure glare. In some implementations, for example, the unified glare rating (UGR) may be employed to measure the glare in an environment. The following formula may be employed to obtain a UGR measurement:

$$UGR = 8 \log_{10} \frac{0.25}{L_b} \sum_n \left( L_n^2 \frac{\omega_n}{p_n^2} \right)$$

where $L_n$ is the luminance of light source n, $\omega_n$ is the angle between the observer and the light source n, and $p_n$ is the Guth position index.

In many aspects of this disclosure, the term route segment is used to discuss a particular portion of a route on which a vehicle may travel. A route segment may include a road, portion of a road, path, bridge, on-ramp, off-ramp, or any other roadway, path, or portion of a roadway or path on which vehicles may travel. It should be noted many route segments allow a vehicle to travel in at least two directions. Further, the direction in which a vehicle is traveling will greatly affect the vehicle's exposure to glare. In some examples a vehicle traveling one direction on a route segment may experience high levels of glare while a vehicle traveling in the opposite direction on a route segment may experience little to no levels of glare. For this reason, references to a route or route segment within this disclosure refers to a specific direction of travel on that road, portion of road, path, etc., such that glare data or a glare factor associated with a route or route segment indicates the glare associated with one direction of travel. Therefore, for example, a single road in reality may have multiple glare factors associated with it, and only a single glare factor may be relevant to a particular vehicle depending on the direction of travel of the vehicle.

As will be appreciated by one of skill in the art upon reading the following disclosure, various aspects described herein may be embodied as a method, a computer system, or a computer program product. Accordingly, those aspects may take the form of an entirely hardware embodiment, an entirely software embodiment or an embodiment combining software and hardware aspects. Furthermore, such aspects may take the form of a computer program product stored by one or more non-transitory computer-readable storage media having computer-readable program code, or instructions, embodied in or on the storage media. Any suitable computer-readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

FIG. 1 illustrates a block diagram of an example glare detection computing device (or system) 101 in a computer system 100 that may be used according to one or more illustrative embodiments of the disclosure. The glare detection computing device 101 may have a processor 103 having circuitry for controlling overall operation of the device 101 and its associated components, including RAM 105, ROM 107, input/output module 109, and memory 115. The glare detection computing device 101, along with one or more additional devices (e.g., terminals 141 and 151, security and integration hardware 160) may correspond to any of multiple systems or devices described herein, such as personal mobile devices, vehicle-based computing devices, insurance systems servers, glare detection servers, internal data sources, external data sources, and other various devices in a glare detection system. These various computing systems may be configured individually or in combination, as described herein, to collect and analyze glare data, environmental data, driver data, vehicle data (such as sensor data and digital imaging data), and/or driving trip data, detect potential glare exposure based on the received data, provide audio and/or visual warning signals to a vehicle, provide vehicular controls to a vehicle, provide recommended route options to a driver or automated control system, provide modified or corrected route options to a driver or automated control system, and the like, using the devices of the glare detection systems described herein. In addition to the features described above, the techniques described herein also may be used for controlling operation of a vehicle, a vehicle sub-system, and/or a vehicle component, generating and presenting glare factors, recommended routes, proposed corrected routes or modified routes, or the like, to users (e.g., via a computing device, such as an on-board vehicle computing device, mobile device, or the like).

Input/Output (I/O) 109 may include a microphone, keypad, touch screen, and/or stylus through which a user of the glare detection computing device 101 may provide input, and may also include one or more of a speaker for providing audio output and a video display device for providing textual, audiovisual and/or graphical output. Software may be stored within memory 115 and/or storage to provide instructions to processor 103 for enabling device 101 to perform various actions. For example, memory 115 may store software used by the device 101, such as an operating system 117, application programs 119, and an associated internal database 121. The various hardware memory units in memory 115 may include volatile and nonvolatile, removable and non-removable media implemented in any method or technology for storage of information such as computer-readable instructions, data structures, program modules or other data. Certain devices and systems within glare detection systems may have minimum hardware requirements in order to support sufficient storage capacity, processing capacity, analysis capacity, network communication, etc. For instance, in some embodiments, one or more nonvolatile hardware memory units having a minimum size (e.g., at least 1 gigabyte (GB), 2 GB, 5 GB, etc.), and/or one or more volatile hardware memory units having a minimum size (e.g., 256 megabytes (MB), 512 MB, 1 GB, etc.) may be used in a device 101 (e.g., a personal mobile device, a vehicle-based device, a glare detection server, etc.), in order to collect and analyze glare data, environmental data, driver data, vehicle data (such as sensor data and digital imaging data), and/or driving trip data, predict glare exposure based on the received data, provide audio and/or visual warnings to a driver, provide vehicular controls to a vehicle, provide recommended route options to a driver or automated control system, provide modified or corrected route options to a driver or modified control system, using the various devices of the glare detection systems, etc. Memory 115 also may include one or more physical persistent memory devices and/or one or more non-persistent memory devices. Memory 115 may include, but is not limited to, random access memory (RAM) 105, read only memory (ROM) 107, electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by processor 103.

Processor 103 may include a single central processing unit (CPU), which may be a single-core or multi-core processor (e.g., dual-core, quad-core, etc.), or may include multiple CPUs. Processor(s) 103 may have various bit sizes (e.g., 16-bit, 32-bit, 64-bit, 96-bit, 128-bit, etc.) and various processor speeds (ranging from 100 MHz to 5 Ghz or faster). Processor(s) 103 and its associated components may allow the system 101 to execute a series of computer-readable instructions, for example, collect and analyze glare data, environmental data, driver data, vehicle data (such as sensor data and digital imaging data), and/or driving trip data, predict glare exposure based on the received data, provide audio and/or visual warnings to a driver, provide vehicular control event signals to a vehicle, provide recommended route options to a driver or automated control system, provide modified or corrected route options to a driver or automated control system, and the like.

The computing device (e.g., a personal mobile device, vehicle-based system, insurance system server, glare detection server, etc.) may operate in a networked environment 100 supporting connections to one or more remote computers, such as terminals 141, 151, and 161. Such terminals may be personal computers or servers 141 (e.g., home computers, laptops, web servers, database servers), mobile communication devices 151 (e.g., mobile phones, tablet computers, etc.), vehicle-based computing systems 161 (e.g., on-board vehicle systems, telematics devices, mobile phones or other personal mobile devices installed at, attached to, or residing within vehicles), and the like, each of which may include some or all of the elements described above with respect to the glare detection computing device 101. The network connections depicted in FIG. 1 include a local area network (LAN) 125 and a wide area network (WAN) 129, and a wireless telecommunications network 133, but may also include other networks. When used in a LAN networking environment, the computing device 101 may be connected to the LAN 125 through a network interface or adapter 123. When used in a WAN networking environment, the device 101 may include a modem 127 or other means for establishing communications over the WAN 129, such as network 131 (e.g., the Internet). When used in a wireless telecommunications network 133, the device 101 may include one or more transceivers, digital signal processors, and additional circuitry and software for communicating with wireless computing devices 151 and 161 (e.g., mobile phones, portable customer computing devices, vehicle-based computing devices and systems, etc.) via one or more network devices 135 (e.g., base transceiver stations) in the wireless network 133.

Also illustrated in FIG. 1 is a security and integration layer 160, through which communications are sent and managed between the device 101 (e.g., a personal mobile device, a vehicle-based computing device, a glare detection server, an intermediary server and/or external data source servers, etc.) and the remote devices (141, 151, and 161) and remote networks (125, 129, and 133). The security and integration layer 160 may comprise one or more separate computing devices, such as web servers, authentication servers, and/or various networking components (e.g., firewalls, routers, gateways, load balancers, etc.), having some or all of the elements described above with respect to the computing device 101. As an example, a security and integration layer 160 of a server 101 may comprise a set of web application servers configured to use secure protocols and to insulate the device 101 from external devices 141, 151, and 161. In some cases, the security and integration layer 160 may correspond to a set of dedicated hardware and/or software operating at the same physical location and under the control of same entities as device 101. For example, layer 160 may correspond to one or more dedicated web servers and network hardware in a vehicle and driver information datacenter or in a cloud infrastructure supporting cloud-based vehicle identification, vehicle and driver data retrieval and analysis, sensor data retrieval and analysis, and the like. In other examples, the security and integration layer 160 may correspond to separate hardware and software components which may be operated at a separate physical location and/or by a separate entity.

As discussed below, the data transferred to and from various devices in a glare detection system 100 may include secure and sensitive data, such as confidential vehicle operation data, insurance policy data, and confidential user data from drivers and passengers in vehicles. Therefore, it may be desirable to protect transmissions of such data by using secure network protocols and encryption, and also to protect the integrity of the data when stored on the various devices within a system, such as personal mobile devices, vehicle-based devices, insurance servers, glare detection servers, external data source servers, or other computing devices in the system 100, by using the security and integration layer 160 to authenticate users and restrict access to unknown or unauthorized users. In various implementations, security and integration layer 160 may provide, for example, a file-based integration scheme or a service-based integration scheme for transmitting data between the various devices in an electronic display system 100. Data may be transmitted through the security and integration layer 160, using various network communication protocols. Secure data transmission protocols and/or encryption may be used in file transfers to protect to integrity of the data, for example, File Transfer Protocol (FTP), Secure File Transfer Protocol (SFTP), and/or Pretty Good Privacy (PGP) encryption. In other examples, one or more web services may be implemented within the various devices 101 in the system 100 and/or the security and integration layer 160. The web services may be accessed by authorized external devices and users to support input, extraction, and manipulation of the data (e.g., glare data, environmental data, vehicle data, driver data, driving trip data, road segment sensor data, etc.) between the various devices 101 in the system 100. Web services built to support a personalized display system may be cross-domain and/or cross-platform, and may be built for enterprise use. Such web services may be developed in accordance with various web service standards, such as the Web Service Interoperability (WS-I) guidelines. In some examples, a glare data, environmental data, driver data, vehicle data, road segment sensor data, and/or driving trip data analysis web service, a glare analysis web service, or the like, may be implemented in the security and integration layer 160 using the Secure Sockets Layer (SSL) or Transport Layer Security (TLS) protocol to provide secure connections between servers 101 and various clients 141, 151, and 161. SSL or TLS may use HTTP or HTTPS to provide authentication and confidentiality. In other examples, such web services may be implemented using the WS-Security standard, which provides for secure SOAP messages using XML encryption. In still other examples, the security and integration layer 160 may include specialized hardware for providing secure web services. For example, secure network appliances in the security and integration layer 160 may include built-in features such as hardware-accelerated SSL and HTTPS, WS-Security, and firewalls. Such specialized hardware may be installed and configured in the security and integration layer 160 in front of the web servers, so that any external devices may communicate directly with the specialized hardware.

Although not shown in FIG. 1, various elements within memory 115 or other components in system 100, may include one or more caches, for example, CPU caches used by the processing unit 103, page caches used by the operating system 117, disk caches of a hard drive, and/or database caches used to cache content from database 121. For embodiments including a CPU cache, the CPU cache may be used by one or more processors in the processing unit 103 to reduce memory latency and access time. In such examples, a processor 103 may retrieve data from or write data to the CPU cache rather than reading/writing to memory 115, which may improve the speed of these operations. In some examples, a database cache may be created in which certain data from a database 121 (e.g., a database of glare data, environmental data, driver data, driving behaviors or characteristics, passenger-related data, vehicle data, driving trip data, road segment sensor data, etc.) is cached in a separate smaller database on an application server separate from the database server (e.g., at a personal mobile device, vehicle-based data, or intermediary network device or cache device, etc.). For instance, in a multi-tiered application, a database cache on an application server can reduce data retrieval and data manipulation time by not needing to communicate over a network with a back-end database server. These types of caches and others may be included in various embodiments, and may provide potential advantages in certain implementations of glare detection systems, such as faster response times and less dependence on network conditions when transmitting and receiving driver information, vehicle information, driving trip information, sensor data, digital image data, and the like.

It will be appreciated that the network connections shown are illustrative and other means of establishing a communications link between the computers may be used. The existence of any of various network protocols such as TCP/IP, Ethernet, FTP, HTTP and the like, and of various wireless communication technologies such as GSM, CDMA, WiFi, and WiMAX, is presumed, and the various computing devices in glare detection system components described herein may be configured to communicate using any of these network protocols or technologies.

Additionally, one or more application programs 119 may be used by the various computing devices 101 within a glare detection system 100 (e.g., glare data, environmental data, vehicle data, driver data, road segment sensor data, and/or driving trip data analysis software applications, glare analysis software applications, etc.), including computer executable instructions for receiving and analyzing various glare data, environmental sensor data, driver data, vehicle data, digital imaging data, and/or driving trip data, predicting glare exposure, providing audio and/or visual warnings to a driver based on a detected glare factor, providing vehicular control event signals to a vehicle, providing recommended route options to a driver or an automated control system, and/or performing route correction or modification based on glare data and/or environmental data.

Figure 2:
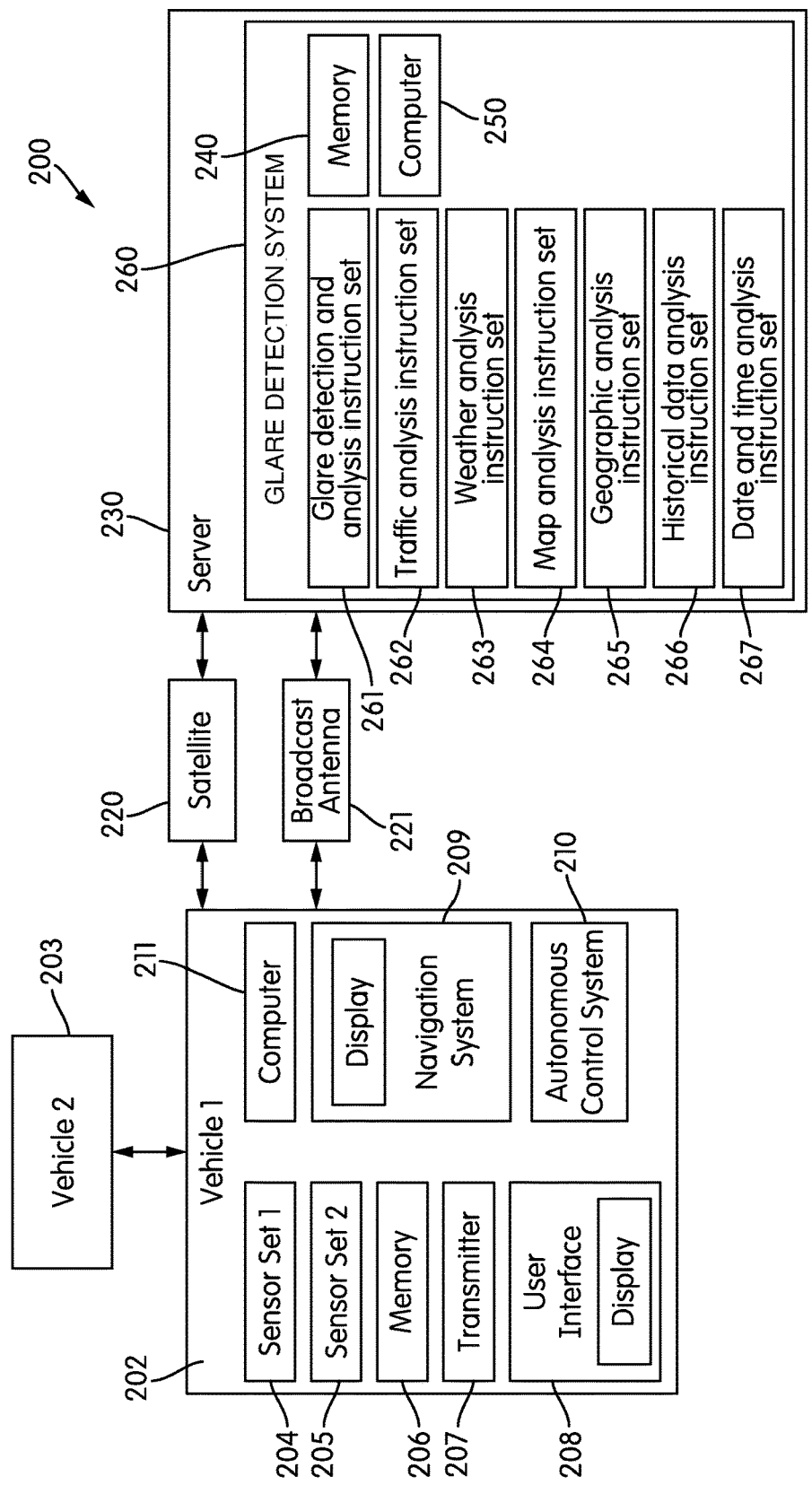
FIG. 2 is a diagram illustrating various example components of a glare detection system according to one or more aspects of the disclosure.

FIG. 2 is a schematic diagram of an illustrative glare detection system network 200 for implementing methods according to the present disclosure. As shown in FIG. 2, the network environment 200 may include computing devices within or associated with a vehicle 202 (e.g., sensor set 204 or 205, memory 206, transmitter 207, user interface 208, navigation system 209, autonomous control system 210, and internal computer processor 211) satellites 220, cellular network elements 221 (e.g., broadcast antennas), a glare detection server 230, and a glare detection system 260 containing instruction sets, a memory for storing data 240, and a computer processor 250. As illustrated in FIG. 2, in some aspects the glare detection server 230 may act as an entry point to the glare detection system 260, such that the server manages communications between this system and external components of the network such as vehicles, sensors, satellites, external databases, etc.

The network environment 200 may utilize one or more communication protocols (e.g., protocols for the Internet (IP), Bluetooth, cellular communications, satellite communications, etc.) to connect sensors, computing devices, and servers within the network environment 200 for exchanging communications. In particular, the network environment 200 may include a cellular network and its components, such as base stations. Accordingly, for example, sensor sets 204 and/or 205 within a vehicle 202 may reciprocally communicate, via, in some examples, a satellite 220 or broadcast antenna 221 of the network environment 200, with a glare detection server 230 which in turn may communicate with a glare detection system 260 comprising unique instruction sets, a memory 240, and a computer processor 250. In some examples the glare detection system 260 may connect through the server 230 to receive additional information from sources not explicitly shown in FIG. 2. For example, in some embodiments the glare detection system may comprise instruction sets to connect to external sources, via internet, Bluetooth, satellite, etc., to receive current data sets, such as traffic data sets or weather data sets. This information may be analyzed at the glare detection system 260 and information may be communicated back through the network environment 200 to the vehicle 202.

FIG. 2 illustrates a first vehicle 202. Additionally, the vehicle 202 may be configured to communicate with at least a second vehicle 203. The vehicle 202 may be any type of vehicle, including a car, motorcycle, bicycle, scooter, drone (or other automated device), truck, bus, boat, plane, helicopter, etc. FIG. 2 also illustrates an example subsystem within the network environment 200. Specifically, FIG. 2 illustrates an example arrangement of computing devices that may exist within the vehicle 202, vehicle 203 and other vehicles not shown. To depict these computing devices, FIG. 2 includes an exemplary diagram of the inside of the vehicle 202. As shown in FIG. 2, the vehicle 202 may include a variety of internal system components, which may include a first sensor set 204 and at least a second sensor set 205. The vehicle 202 may further include a memory 206, transmitter 207, user interface 208, navigation system 209, autonomous control system 210, and computer 211. In various examples, the vehicle 202 may include all, some, or none of these internal system components and in further examples may include any variation of these internal components.

The vehicle 202 includes one or more vehicle operation sensors, such as sensor sets 204 and 205, capable of detecting and storing the external driving conditions, for example, a sensor set may detect and record weather data such external temperature, rain, snow, light levels, and sun position for driver visibility. Further, additional vehicle operation sensors may include external cameras and proximity sensors that detect other nearby vehicles, vehicle spacing, traffic levels, road conditions, traffic obstructions, animals, cyclists, pedestrians, and other conditions that may factor into a driving data/behavior analysis. Additional vehicle operation sensors also may detect and store data relating to moving violations and the observance of traffic signals and signs by the vehicle 202 capable of detecting and recording various conditions at the vehicle and operational parameters of the vehicle. For example, a vehicle operation sensor may detect and store data corresponding to the vehicle's location (e.g., GPS coordinates), time, travel time, speed and direction, rates of acceleration or braking, gas mileage, and specific instances of sudden acceleration, braking, swerving, and distance traveled.

Additional vehicle operation sensor sets also may detect and store data received from the vehicle's 202 internal systems, such as impact to the body of the vehicle, air bag deployment, headlights usage, brake light operation, door opening and closing, door locking and unlocking, cruise control usage, hazard lights usage, windshield wiper usage, horn usage, turn signal usage, seat belt usage, phone and radio usage within the vehicle, autonomous driving system usage, maintenance performed on the vehicle, and other data collected by the vehicle's computer systems, including the vehicle on-board diagnostic systems (OBD). Additional operation sensors may detect and store data relating to the maintenance of the vehicle 202, such as the engine status, oil level, engine coolant temperature, odometer reading, the level of fuel in the fuel tank, engine revolutions per minute (RPMs), software upgrades, and/or tire pressure.

Further, the sensor set 204 and/or the sensor set 205 may be configured to record and collect information relating to glare exposure, traffic, weather, geography, time of day, day of week, road attributes, topography, structures, and any other information potentially affecting glare. The data collected by sensor set 204 and/or sensor set 205 may be recorded and stored in memory 206. The vehicle 202 may also include a user interface 208 for a user to provide inputs to and receive outputs from the vehicle computer system 211. The data collected by sensor set 204 and/or sensor set 205 may be communicated through a transmitter 207 to a server 230 via a communication protocol, such as a satellite 220 or a broadcast antenna 221 as shown, but also through any other method for communicating data.

In some embodiments, a sensor device may also be configured to collect drive data using, e.g., an accelerometer, GPS, gyroscope, etc. Drive data may include vehicle telematics data or any other data related to events occurring during a vehicle's trip (e.g., changes in acceleration or orientation of the vehicle, etc.). For example, drive data may include location information, such as GPS coordinates, indicating the geographical location of the vehicle 202 as well as speed and acceleration data that may be used to detect speeding, cornering, swerving, and hard-braking events. As described in further detail below, the glare detection system 260 may collect and process the drive data to compile observed amounts of glare along various road segments and correlate that glare with other factors such as, for example, time of day, traffic levels, weather conditions, and the like.

A vehicle 202 may be controlled by an autonomous control system 210 and/or a remote computing device (not shown) via the network 200 or another network. The autonomous control system 210 may employ sensors for inputting information related to a vehicle's surroundings (e.g., distance from nearby objects) and use the inputted information to control components of the vehicle 202 to drive the vehicle 202. In different embodiments the automated control system 210 may control all systems of vehicle operation or only some systems or subsystems of vehicle operation. In some aspects the automated control system 210 may be configured to be selectively turned off such that no systems or subsystems are autonomously controlled. In some embodiments the autonomous control system 210 may be configured to selectively automate certain systems, subsystems, operations, or features of vehicle operation as chosen by a user, such that in different aspects the operation of the vehicle 202 may be autonomous, manual, or a combination thereof. As an example, the autonomous control system 210 may control one or more of the following: braking, headlight control, navigation, vehicle speed, window and/or windshield tint, horn, and gears. In different embodiments the automated control system 210 may automate any aspect of vehicle operation.

In some aspects, the systems or subsystems that may be automated by the control system 210 may be customized based on the user characteristics or preferences of the driver. In one aspect, a user profile may be created and which may be stored locally at memory 206 within the vehicle 202 or remotely at the glare detection system 260, and which later may be accessed when performing glare analysis. User profile data may include the driver's age, a quality of the driver's eye-sight, estimated reaction time, routes commonly driven by the driver, the glare factors on the user's common routes, willingness to encounter particular glare factors, etc. In another arrangement, user profile data, such as the glare factors on the user's common route, may have been previously determined or may be dynamically determined by one or more computing devices, such as the glare detection system 260.

In different aspects, various responses at the vehicle may be automatically triggered based on detection of certain data. In some examples, based on a detected level of glare encountered along a route, the glare detection system 260 may command the vehicle to automatically darken the windshield, switch at least one aspect of vehicle operation from automated to manual if the glare level impairs the ability of the automated control system, switch at least one aspect of vehicle operation from manual to automated control if the glare level impairs the ability of the driver to operate the vehicle, automatically cause the braking of the vehicle, issue an audible, visual, or physical warning to the driver, switch the car's headlight level, or any other response that would reduce potential danger associated with glare exposure. Additional aspects may include providing forward, or rear camera video on the vehicles multi-function display as a secondary visual perspective.

The glare detection system 260 shown in FIG. 2 may be associated with, internal to, operated by, or the like, an entity such as an insurance provider. In some examples, the entity may be one of various other types of entities, such as a government entity, corporation or business, university, or the like. Various examples described herein will be discussed in the context of an insurance provider. However, nothing in the specification should be viewed as limiting use of the systems, methods, arrangements, etc. described herein to use only by an insurance provider.

In different aspects the glare detection system 260 may include one or more subsystems that may include hardware and/or software configured to perform various functions within the system 260. The one or more subsystems may be separate, physical devices or, in other examples, one or more subsystems may be part of the same physical device. A subsystem may include an instruction set stored in a physical memory that are executable by a processor (such as processor 103 in FIG. 1) to carry out aspects and functions associated with receiving and analyzing various glare data, environmental data, driver data, vehicle data, digital imaging data, and/or driving trip data, providing recommended route options to a driver or automated control system, and providing modified or corrected route options to a driver or automated control system.

The glare detection system 260 may include various sets of instructions that, when executed, carry out aspects of the present disclosure. The instructions sets of the glare detection system 260, in this example, include a glare detection and analysis instruction set 261. In certain aspects the glare detection and analysis instruction set 261, when executed, cause the glare detection system 260 to communicate with the first vehicle 202. The glare detection system 260 may send commands to the vehicle 202 to begin recording data at a first sensor set 204. In some aspects this first sensor set may be configured to detect glare and record glare data. The sensor set 204 may include a single sensor device or a plurality of sensor devices. The sensor set 204 may be located in the front of the car, the rear of the car, the top of the car, the bottom of the car, on the interior of the car, on the exterior or the car, or combinations thereof. In some aspects the first sensor set 204 may be configured to be moved to different positions within or connected to the vehicle 202. In some examples the sensor set may be located such that it may record glare that would be encountered by an autonomous control system 210 while the vehicle 202 was being operated by the autonomous control system. In other examples the sensor may be located such that it may record glare that would be encountered by a driver while operating the vehicle 202. In some aspects the sensor may include internal cameras or video recorders to detect information relating to a driver of the vehicle, such as the driver's height, positional orientation, eye movement, etc., such that the sensor set 204 only detects and/or records glare that would affect the driver's line of sight.

In some aspects the first sensor set 204 may comprise a digital imaging device, such a digital camera. In other aspects the first sensor set 204 may comprise an optical imaging device or light detection device. In some aspects the sensor set 204 may take images at preconfigured intervals, or when instructed to do so by a user. In other aspects the sensor set 204 may comprise a digital video recorder and may collect information continuously. Digital images may include images obtained using photographic imaging techniques, videographic imaging techniques, radar imaging techniques, sonar imaging techniques, and laser imaging techniques (e.g., LIDAR—Light Detection and Ranging), and other types of imaging techniques suitable for obtaining digital images and detecting light exposure during a route of travel. In some examples the glare detection instructions set 261 may command the sensor set 204 to record all collected glare data at a memory 206. In further aspects the sensor set 204 may only record glare data at a memory if it rises above a preconfigured threshold. The glare data detected at the first sensor set 204 may be stored at a memory in the car and/or may be transmitted back to the glare detection system to be stored at a memory 240.

In further aspects the glare detection and analysis instruction set 261, when executed, may cause the glare detection system 260 to send commands to the vehicle 202 to communicate with other vehicles when it is determined that the recorded glare data is above a predetermined threshold. In some aspects, when the sensor set 204 detects glare that is above the predetermined threshold, the vehicle 202 may communicate with vehicles within a given surrounding area, such as vehicle 203, to send a signal that the glare levels are above the threshold. For example, a vehicle traveling along a road segment may transmit glare information to one or more vehicles trailing that vehicle. In this way, the trailing vehicles may be forewarned about upcoming glare along that road segment and take preemptive action in response. The leading vehicle may communicate with one or more trailing vehicles directly, for example, by broadcasting the glare information such that the information is received by any vehicle within the vicinity of the broadcast. The leading vehicle may also communicate with one or more trailing vehicles indirectly, for example, by transmitting the glare information to the glare detection system 260 which may then transmit that glare information to the other vehicles. The glare detection system 260 may push the received glare information to other vehicles determined to be within the vicinity of the leading vehicle. A vehicle may also pull the glare information from the glare detection system 260 by requesting the latest glare information associated with the current geographic location of the vehicle. Waypoints may also be installed along road segments that collect and store glare information transmitted by passing vehicles. The waypoints may then transmit the glare information to other waypoints for storage and/or other passing vehicles to inform those vehicles about upcoming amounts of glare along the road segment.

In some aspects vehicle 203 may comprise a display or warning device that configured to alert the operator of vehicle 203 of the high glare level. In some examples this warning device may provide a visual, audible, or physical, such as vibrating, warning. If vehicle 203 is autonomously operated, this signal may inform the autonomous operating system of vehicle 203 to avoid the route segment where the glare above the threshold was detected. If the vehicle is manually operated the warning may, in some examples, be provided via the navigation system 209, for example, in the form of color-coded route segments in which respective colors correspond to an amount of glare associated with a road segment, e.g., a current amount of glare observed by vehicles traveling that road segment or an anticipated amount of glare associated with the road segment based on historical glare data. In different aspects the vehicle 202 may communicate a glare level with surrounding vehicles based on the magnitude of the glare detected. If the glare is slightly above the predetermined threshold, vehicle 202 may only communicate with vehicles in a small radius, but if the glare detected is determined to be significantly above the threshold vehicle 202 may communicate this information to other vehicles in a much larger radius.

In further aspects, the glare detection system 260 will include further instruction sets. In different aspects the glare detection system 260 may initiate one instruction set, multiple instruction sets, all of the instructions set, or any combination of instruction sets at a given time. As shown in FIG. 2, in some aspects instruction sets may include, but are not limited to: glare detection and analysis, traffic analysis, weather analysis, map analysis, geographic analysis, date and time analysis, and historical data analysis.

In some aspects the first vehicle 202 will be equipped with additional operation sensors capable of recording additional conditions inside or outside the vehicle. These sensors may detect and record detect other nearby vehicles, vehicle spacing, traffic levels, road conditions, traffic obstructions, animals, cyclists, pedestrians, and other conditions that may factor into a driving data/behavior analysis.

The traffic analysis instruction set 262, when executed, may cause the glare detection system 260 to communicate with the vehicle 202 and command the vehicle to activate a sensor set, such as sensor set 205, and to detect and record traffic data throughout the vehicle traveling along its route. The traffic data recorded at sensor set 205 may be stored at memory 206 in the vehicle or communicated to the glare detection server 230 where it may be analyzed by the glare detection system 260 and/or stored at a memory 240. In other aspects the traffic analysis instruction set 262 when executed, may cause the glare detection system 260 to communicate via a network to receive dynamic traffic data from third-party data sources, such as external traffic databases containing traffic data. In different aspects, the glare detection system 260 may receive traffic data from vehicle 202 or third-party data sources, including data such as amounts of traffic, average driving speed, traffic speed distribution, and numbers and types of accidents, etc. In further aspects the glare detection system 260 may receive from vehicle 202 or external data sources information containing driving hazard data, including road hazards, traffic accidents, downed trees, power outages, road construction zones, school zones, and natural disasters, etc. As described in further detail below, the traffic data collected may be processed and analyzed to correlate traffic levels and observed amounts of glare.

The weather analysis instruction set 263, when executed, may cause the glare detection system 260 to communicate with the vehicle 202 and command the vehicle to activate a sensor set, such as sensor set 205, and to detect and record weather data throughout the vehicle traveling along its route. The weather data record at sensor set 205 may be stored at memory 206 in the vehicle or communicated to the glare detection server 230 where it may be analyzed by the glare detection system 260 and/or stored at a memory 240. In other aspects the weather analysis instruction set may cause the glare detection system 260 to communicate with a network to receive dynamic weather data from third-party data sources, such as external weather databases containing weather data. In different aspects, the glare detection system 260 may receive weather data from vehicle 202 or third-party data sources, including data such as external temperature, precipitation data (rain, snow, hail, sleet, etc.), light levels, sun position, wind strength and direction, humidity, cloud position, etc. As described in further detail below, the weather data collected may be processed and analyzed to correlate various weather conditions and observed amounts of glare.

In some aspects additional instruction sets within the glare detection system 260, including as examples, a map analysis instruction set 264, a geographic analysis instruction set 265, a historical data analysis instruction set 266, and a date and time analysis instruction set 267. A map analysis instruction set 264, when executed, may cause the glare detection system 260 to analyze map data to determine route segments and route segment combinations, distance between points, duration of travel between two points, etc. The map analysis instruction set may further determine overall glare factors for routes based on the glare data associated with the route segments comprising the route, rank or compare alternative route options based on the overall glare factor, and determine and/or recommend a recommended route based on the overall glare factor. A geographic analysis instruction set 265, when executed, may cause the glare detection system 260 to analyze geographic data such as elevation, topography, natural structures, waterways, trees, shrubbery, fields, etc. The glare detection system may also correlate specific geographic features with the observed amount of glare. A historical data analysis instruction set 266, when executed, may cause the glare detection system 260 to analyze historical data relating to any data that may influence glare exposure, including all data analyzed by other instruction sets, including historical glare exposure, weather, traffic, geography, etc. In some aspects collected data, including data relating to glare, weather, traffic, geography, etc., may be stored within the glare detection system 260 at a memory 240. The glare detection system 260 may recover this stored data and analyze it to determine correlations between glare data and other data sets. Based upon determining correlations, the glare detection system 260 may perform analysis to provide anticipated levels of glare. A date and time analysis instruction set 267, when executed, may cause the glare detection system 260 to analyze and/or record information relating to time, date, day of the week, year, season, etc. The date and time analysis may provide useful information relating to glare detection, such as whether glare is higher during the day or at night, whether day of the week affects glare factors, and if glare exposure varies at different times of the year or changes in glare data over time. These instruction sets are simply examples of instruction sets that may contribute to the detection, recording, and prediction of glare data and should not limit the type or number of instruction sets that may be included in the glare detection system 260.

In some examples, the sensor data received and/or processed by the system may be controlled based on one or more conditions. For instance, although a sensor set may have a fixed number of sensors detecting conditions, the system may receive data from a portion of the sensors (e.g., less than all the sensors) when certain conditions are met. For instance, if it is daylight, data might be received from less than all sensors on a road segment. If the weather is dry and clear, data may be received from less than all the sensors in the sensor set. Alternatively, if it is dark and/or the weather conditions are poor, data may be received from all sensors in order to obtain as much data as possible.

In some examples, receiving data from less than all sensors may include controlling sensors transmitting data. For instance, glare detection and analysis instruction set 261, or other instruction sets within the glare detection system 260 may transmit a command to one or more sensors to not transmit data until reactivated. Additionally or alternatively, glare detection system 260 may further filter the data upon receipt. That is, data may be received from all sensors from a sensor set but only data from some sensors may be processed in order to conserve resources (e.g., computing resources), streamline the processing of data, improve data processing time, remove irrelevant data, etc. In some examples, a determination of whether the conditions are sufficient to receive/process data from fewer than all sensors in a sensor set may be made by the glare detection system 260, or may be determined from an external source and received at the glare detection server 230.

Figure 3:
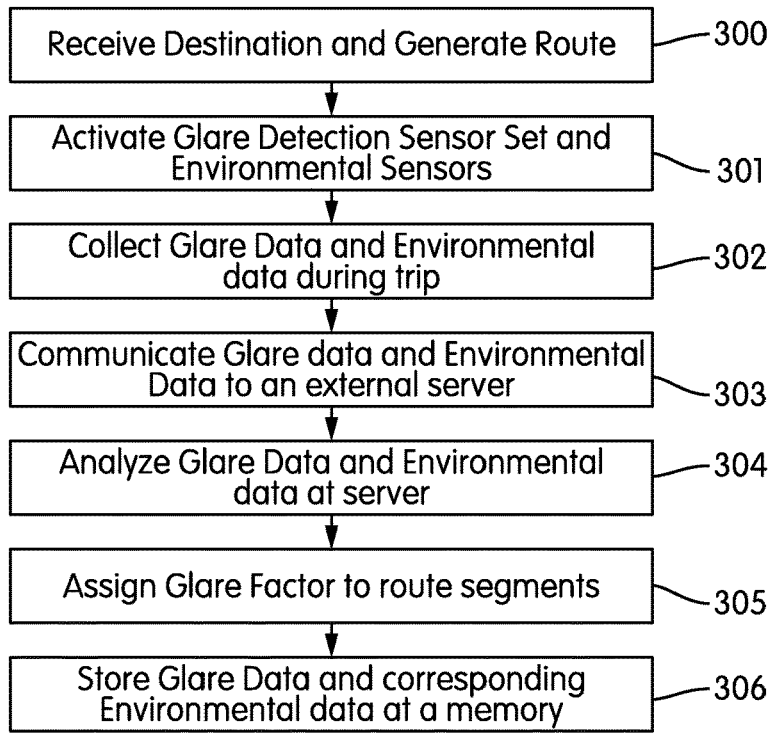
FIG. 3 is a flow diagram illustrating an example method of collecting glare information and storing it at a memory.

FIG. 3 is a flow chart illustrating one example method of detecting, measuring and storing glare data and environmental data. The steps shown in the flow chart may be executed by a single computing device, such as vehicle control computer 211 or glare detection system 260. Alternatively, execution of the steps shown in the flow chart may be distributed between vehicle control computer 211 and glare detection system 260. The illustrated method may be performed at regular time intervals (i.e. every 0.5 seconds, every second, every two seconds, etc.), at irregular intervals, or on-demand in response to input received from a user. At step 300, predefined navigational data may be received. In some aspects the vehicle will communicate a destination in order to generate a route. The location of vehicle may be inputted or determined by a positioning detection device, such as a GPS. The navigational data may be analyzed with the location and destination to determine potential route segment combinations that may be traveled between the location and the destination. The route segments combinations may be analyzed to determine a recommended route. In some aspects the recommended route may be determined based on shortest distance, minimal travel time, reduced exposure to traffic, etc. The recommended route will include individual route segments. In some aspects the recommended route may be transmitted from the glare detection system 260 through the glare detection server 230 to the vehicle. In some aspects the glare detection system 260 may transmit a command to the vehicle to store the recommended route at a memory in the vehicle. In other aspects the vehicle may be operated manually by a user and glare detection system 260 may transmit a command to the vehicle to display the recommended route on a navigation system. In further aspects the vehicle may be autonomously controlled and glare detection system 260 may transmit a command to the vehicle to activate the autonomous control system 210 within the vehicle.

Predefined navigational data may include map data. Route information (e.g. route attribute data) in the map data may comprise data about the physical attributes of a route (e.g., slope, pitch, surface type, grade, number of lanes, traffic signals and signs and the like). In some aspects, the route information may indicate the presence of other physical attributes of a route, such as a pothole(s), a slit(s), an oil slick(s), a speed bump(s), an elevation(s) or unevenness (e.g., if one lane of a road is higher than the other, which often occurs when road work is being done), etc. In some embodiments, route information may comprise the physical conditions of a route (e.g., flooded, wet, slick, icy, plowed, not plowed/snow covered, etc.). In some instances, road information may be data from a sensor that gathers and/or analyzes some, most, or all vertical changes in a route. In other examples, route information may include information about characteristics corresponding to the rules of the road or descriptions of the route: posted speed limit, construction area indicator (e.g., whether location has construction), topography type (e.g., flat, rolling hills, steep hills, etc.), route type (e.g., residential, interstate, 4-lane separated highway, city street, country road, parking lot, pathway, gravel road, etc.), route feature (e.g., intersection, gentle curve, blind curve, bridge, tunnel), number of intersections, whether a roundabout is present, number of railroad crossings, whether a passing zone is present, whether a merge is present, number of lanes, width of roads/lanes, population density, condition of route (e.g., new, worn, severely damaged with sink-holes, severely damaged by erosion, gravel, dirt, paved, etc.), locations of various landmarks that are commonly found near roadways (traffic lights, traffic signs, street signs, safety barriers, traffic barricades, safety barriers, etc.) wildlife area, state, county, and/or municipality. In some embodiments, route information may include data about infrastructure features of the route. For example, infrastructure features may include intersections, bridges, tunnels, railroad crossings, and other features.

In some aspects, route information may include a large number (e.g., 300) attributes or more for each route segment. Each route may include one or more route segments, and different routes may include a different number of route segments. Also, route segments may vary in length. In some embodiments, route segments may be determined based on the attributes. These attributes may be obtained from a database or via a sensor. In some cases, the attributes of each route segment may be geocoded to a specific route segment or a specific latitude and longitude. For example, the attributes may be things such as, but not limited to, route geometry, addresses, turn and speed restrictions, physical barriers and gates, one-way streets, restricted access and relative road heights, etc. As another example, the route attribute data may consist of information identifying that a route segment has a curvature of n degrees.

Upon receiving route information, the vehicle may activate the glare detection sensors and environmental sensors at step 301. The glare detection sensors may be located a first sensor set 204 and the environmental sensors may be located at a second sensor set 205. In some aspects the glare sensors and environmental sensors, once activated, may remain active throughout the duration of the trip. In other aspects the sensors may be predetermined to be selectively activated at certain time frames. In some aspects the glare detection system may analyze the predefined navigational data to determine particular road segments with attributes that would cause glare, and command the sensors to activate upon travelling on those segments. In some aspects these attributes may be direction, time of day, geography, weather, topography, structures, sight lines, road type, traffic, etc. In these aspects the sensors would only be active in scenarios where a vehicle would be expected to encounter glare, thus increasing the efficiency of the data and reducing the need for the sensors to be activated and engaged at all times, thus conserving power and battery.

Upon activation, the glare detection sensors and environmental sensors may be programmed to collect glare and environmental data during the movement of the vehicle throughout the trip at step 302. The glare detection sensor may record glare data at predetermined time intervals (i.e. every 0.5 seconds, every second, every two seconds, etc.), continuously, or manually in which a user may input when glare is encountered such that the glare detection sensor records glare data. In some aspects the glare data may be analyzed at a computer 211 within the vehicle, such that a value or factor may be assigned to the glare recording. The computer 211 may analyze the glare data such that glare values only exceeding a certain threshold are stored at the memory 206. In different aspects the glare data may be assigned numerical or quantitative values. The glare may be assigned a value on a scale of 1-10, where a value of 1 indicates a low glare level and a value of 10 indicates a very high glare level. The use of a scale of 1-10 is for illustrative purposes, and a similar scale utilizing different numerical values (i.e. 1-5, 1-100) or alphabetical values (A-Z) may be used.

The environmental sensors may be used to detect anything in the vehicle's surrounding environment that may contribute to the effect of glare. In some aspects environmental data may comprise all of combinations of the following: weather data, time of day, day of week, time of year, road attributes, traffic information, geography, topography, natural structures, artificial structures, etc. In some aspects the environmental sensors, such as sensor set 205, may include individual sensor(s) to collect each individual data set. The glare detection system may include individual instruction sets for each data set, such as a traffic analysis instruction set 262, a weather analysis instruction set 263, a map analysis instruction set 264, a geographic analysis instruction set 265, a historical data analysis instruction set 266, a date and time analysis instruction set 267, and other instruction sets relating to data that may affect glare encountered by a vehicle. Weather data may include data relating to: external temperature, precipitation data (rain, snow, hail, sleet, etc.), light levels, sun position, wind strength and direction, humidity, cloud position, etc. Changes in the weather may be recorded throughout the duration of the trip to analyze the effect on glare exposure. Route attributes may include any information that may be included in the predetermined navigational data. Traffic data may include number of vehicles, types of vehicles (car, motorcycle, bicycle, scooter, drone (or other automated device), truck, bus, boat, plane, helicopter, etc.), speed of vehicles (individual vehicle speed, average driving speed, traffic speed distribution), accidents, etc. Further data that may be recorded includes geographic data, including natural structures (elevation, latitude, longitude, waterways, trees, shrubbery, plants, mountains, hills, rocks, etc.). Artificial structures, such as buildings, houses, barns, garages, towers, phone lines, traffic lights, road signs, etc., may also be detected and recorded. In different aspects all of this environmental data may be detected and recorded or only some of it (including different combinations of data sets).

In some aspects, upon collection of glare and environmental data the data may be immediately transmitted back to the glare detection system 260 to be analyzed, such as step 303. In other aspects, the data may be stored at a memory 206 within the vehicle and transmitted at a later time, such as the conclusion of the trip. In further aspects the data may be analyzed at a computer 211 within the vehicle, and the analyzed information may be transmitted to the glare detection system 260 at step 303. The data may be transmitted from the vehicle 202 to the glare detection server 230 where it may be analyzed at the glare detection system 260. The transmitter 207 may include any wireless communication device. The glare and environmental data collected during the trip may be associated with the individual route segment on which it was collected.

At step 304, the glare data and environmental data may be analyzed at the glare detection system 260. The glare data may be analyzed at individual route segments to determine the glare data and environmental data the vehicle encountered at different locations throughout the trip. At step 305, the glare detection system 260 may then determine a glare factor associated with the analyzed glare data and assign it to the individual route segments where the glare data was retrieved. Finally, at step 306 the glare data, including the glare factor associated with particular route segments, may be stored at a memory, such as memory 240, along with the corresponding environmental data. In some aspects the glare data and environmental data will correspond such that it can be determined what the environmental data was when particular glare data was recorded. In some aspects this corresponding data may be stored at a memory as historical glare data that may be retrieved and analyzed such that predicted glare values may be predicted based on encountered environmental data.

It may be noted that in some aspects these systems will become more efficient through the collection and analysis of additional data. As more glare data and environmental data is collected and transmitted to the glare detection system 260, the system may analyze the data to determine what environmental factors and road attributes are predictive of particular glare levels. In this sense, the glare detection system may command the vehicle to collect additional data upon initial implementation, but as more data is gathered and analysis performed, the glare detection system may only command the sensors to collect glare and environmental data on road segments where glare has been historically encountered. Alternatively, the glare detection system may command the sensors to collect glare and environmental data in response to determining a vehicle is traveling on a less frequently traveled road segment for which relatively little glare data has thus far been collected.

Figure 4:
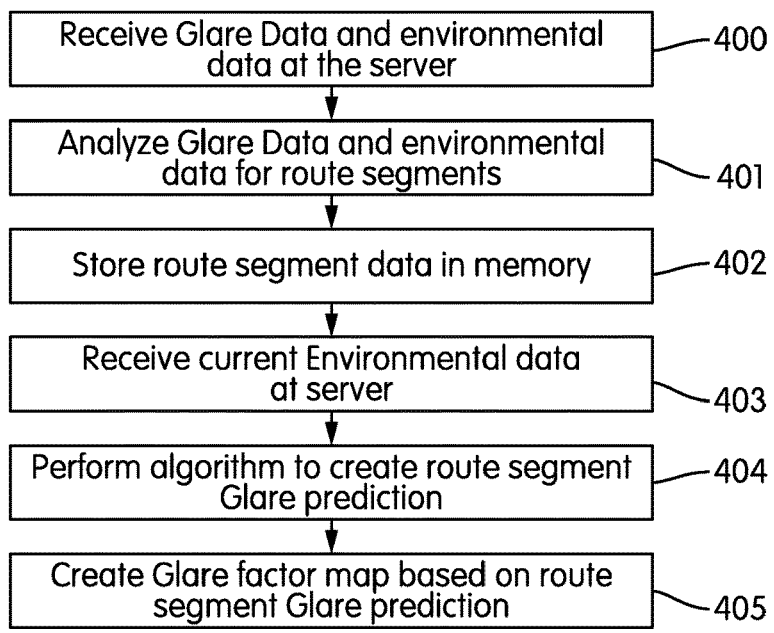
FIG. 4 is a flow diagram illustrating an example method of analyzing glare data with current environmental data to create a glare factor map.

FIG. 4 is a flow chart illustrating an example method of creating a glare factor map. At a first step 400 the glare data and environmental data is received at the glare detection server 230. The glare data and environmental data may be received from a vehicle 202, a memory 240, a combination of the two, or from an external source. The glare data may include route data, including route segment combinations, and assigned glare data to individual route segments. The environmental data may include data related to weather data, time of day, day of week, time of year, road attributes, traffic information, geography, topography, natural structures, artificial structures, etc. At step 401 the glare data and environmental data may then be analyzed by the glare detection system 260 to determine individual route segment data associated with encountered glare and the environmental data associated with the encountered glare. At step 402, this route segment data may be stored at a memory, such as memory 240, or an external source.

At step 403, the glare detection server 230 receives current environmental data. In some aspects, this current environmental data may be received from a vehicle 202, an external source, or a combination of the two. External sources may include environmental information data sources, such as external databases containing traffic data (e.g., amounts of traffic, average driving speed, traffic speed distribution, and numbers and types of accidents, etc.) at various times and locations, external weather databases containing weather data (e.g., rain, snow, sleet, and hail amounts, temperatures, wind, road conditions, visibility, etc.) at various times and locations, and other external data sources containing driving hazard data (e.g., road hazards, traffic accidents, downed trees, power outages, road construction zones, school zones, and natural disasters, etc.). This data may be received from the same or multiple sources. In some aspects the current environmental data may always be received from the same source. In other aspects the data may be analyzed to determine which source has the most recent data and receive the environmental data from that source. In some aspects the environmental data may be received from multiple sources and consolidated to allow for more comprehensive analysis. In some aspects the environmental data received will be analyzed to determine which route segments the data will be applicable. In this sense, the current environmental data may be analyzed and individualized data may be associated with individual route segments.

At step 404 the glare detection system 260 may compare the received current environmental data with the glare data and environmental data stored at a memory 240. The glare detection system 260 may perform mathematical algorithmic analysis on the current environmental data and stored data to determine predicted current glare data based on the current environmental data. In some aspects the algorithms may determine which environmental data variables are most strongly correlated with glare data. The algorithms may then compare these environmental data variables in the current environmental data with the stored environmental data to predict an anticipated amount of glare based on the stored glare data associated with those environmental data variables. As an example, if analysis of the stored data determines that environmental data variables such as time of day, precipitation, and traffic congestion are the most strongly correlated with high glare factors, then the algorithm may only analyze those three variables from the current environmental data. In different aspects the algorithm may use one environmental data variable, two variables, three variables, all variables, half the variables, one third of the variables, etc. in order to predict the anticipated amount of glare, including glare duration in conjunction with time of day variables. In further aspects the analysis may include additional algorithms, functions, or analyses to further increase the accuracy of the glare factor prediction. Upon completion of the algorithmic analysis, the glare detection system 260 will assign a predicted glare factor to each individual route segment. Finally, at step 405, the glare detection system may use the assigned predicted glare factors to create a glare factor map capable of displaying or otherwise providing route segment combinations in a particular area and the glare factors respectively determined for each of those route segments. This map may be used to determine recommended routes for vehicles, to display to an operator of a vehicle, or to save at a memory for future analysis. In some aspects the map may display areas or route segments as certain glare levels, such as high glare, medium glare, and low glare. In other aspects the map may show route segments as colors based on the glare factors, such as green for low or no glare, yellow for medium glare, and red for high glare. In different aspects, more or different colors or displays may be used depending on the amount of detail desired on the glare factor map. In different aspects the glare factor map may be dynamically updated upon receiving new current environmental data. In some aspects this may occur at predetermined intervals, the beginning of a trip, or at the input of a user operator of a vehicle.

Figure 5:
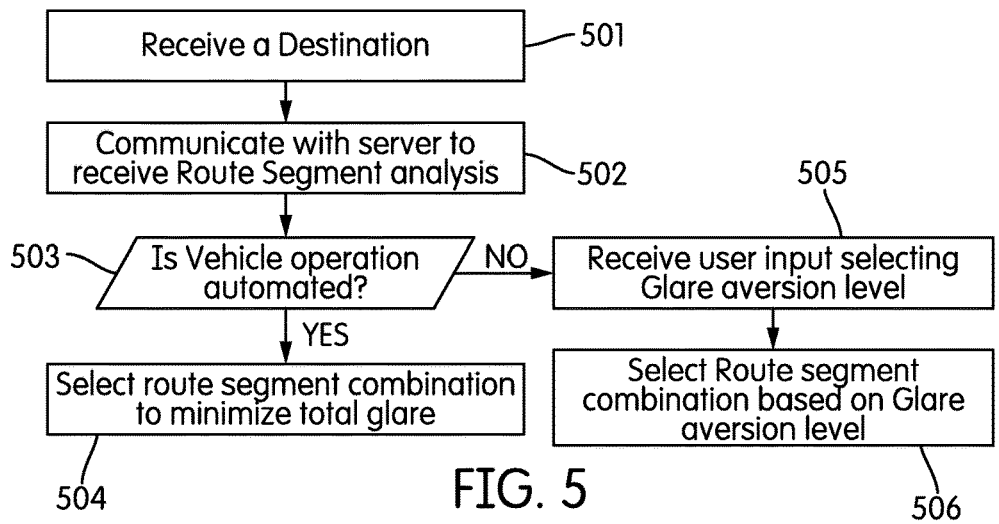
FIG. 5 is a flow diagram illustrating an example method of determining recommended route segment combinations based on whether vehicle operation is automated.

FIG. 5 is a flowchart illustrating a method for selecting a recommended route based on whether the vehicle 202 is manually operated by a user or autonomously operated by a control system 210. At step 501 the glare detection server 230 receives a destination from the vehicle 202. In some aspects the glare detection server 230 may receive a location from the vehicle 202, in other aspects the location may be determined by a positioning device, such as a GPS. The glare detection system 260 may analyze the location and destination and determine potential route segment combinations for the vehicle to travel from the location to the destination. At step 502, the server 230 will communicate with the glare detection system 260 to receive a route segment analysis. The route segment analysis may be based on stored glare data associated with the route segments. In some aspects the glare detection system may average the stored glare data to determine glare factors to assign to route segments. In other aspects certain criteria may be used by the glare detection system to determine what glare data is the most relevant and use that data for the generation of the route segment analysis. The glare detection system 260 may include potential route segments, glare factors associated with route segments, a glare factor map, etc. At step 503 the glare detection system will determine if the vehicle operation is automated. In some aspects the vehicle may be always automatically operated, always manually operated, or configured to switch between operation states such that the vehicle is automatically controlled at a first operation state and manually controlled at a second operation state. In further aspects the autonomous control system 210 may control all aspects of vehicular control, or only some aspects of vehicular control. Whenever some aspects of vehicular control are autonomous and some are manually controlled, the glare detection system will be preconfigured to recognize the vehicle as either autonomously or manually controlled based on which aspects are automated and which are manual.

If the vehicle is determined to be autonomously controlled, the glare detection system will proceed to step 504. The glare detection system will analyze the glare information and select a route combination to minimize total glare encountered by the vehicle upon the route. In other aspects not shown, the glare detection system may select a route combination to keep total glare exposure under a certain threshold, keep glare encountered in any particular route segment below a certain threshold, or perform analysis to balance duration of the trip with glare exposure. In still further aspects the glare detection system may take additional data into account in determining the route combination, such as reducing exposure to other traffic. Upon determining the route combination, the glare detection system may determine a recommended route. In some aspects the glare detection system 260 may transmit a command to the vehicle 202 to activate the autonomous control system 210 within the vehicle based on the recommended route. In other aspects the glare detection system 260 may transmit a command to the vehicle to deactivate the autonomous control system based on the recommended route. In other aspects the glare detection system 260 may transmit a command to the vehicle to deactivate the autonomous control system based on the recommended route. In further aspects the system 260 may command the vehicle 202 to have the autonomous control system 210 perform the recommended route. In some aspects the glare detection system 260 may transmit a command to the vehicle 202 to display the recommended route on a navigation system 209 within the vehicle.

If the vehicle is determined to be manually controlled, the glare detection system will proceed to step 505, and receive a user input selecting a glare factor threshold. This may be a maximum total glare acceptable to be experienced by a user, a maximum glare exposure acceptable to be experienced on any particular route segment, a combination of the two, or acceptable exposure to environmental variables linked to high glare factors. The user input may be dynamically selected by the user at an input in the vehicle 202, it may be predetermined by the user, it may depend on factors predetermined by a user, or be determined in any other manner. For example, in some aspects a user may be more willing to be exposed to potential glare during the middle of the day rather than at night. In this example the user may set predetermined glare factor threshold based on the time of day. In different variations the user glare factor threshold may be predetermined by different inputs or variables. Once the glare factor threshold is received by the glare detection system 260, the system may, at step 506, select a route segment combination based on the glare factor threshold. In some aspects the glare detection system 260 may transmit a command to the vehicle 202 to activate the autonomous control system 210 within the vehicle based on the route segment combination. In other aspects the glare detection system 260 may transmit a command to the vehicle to deactivate the autonomous control system based on the route segment combination. In further aspects the system 260 may command the vehicle 202 to have the autonomous control system 210 perform the recommended route. In some aspects the glare detection system 260 may transmit a command to the vehicle 202 to display the route segment combination on a navigation system 209 within the vehicle. In further aspects the glare detection system 260 may transmit a command to the vehicle to store the recommended route a memory 206 in the vehicle 202.

Figure 6:
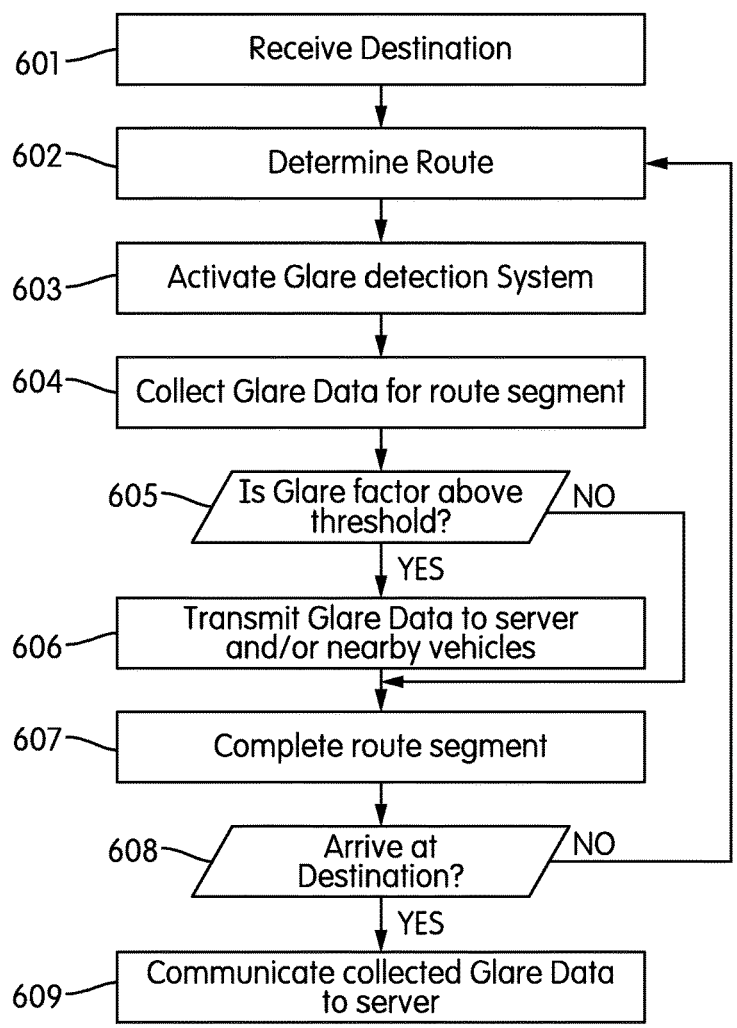
FIG. 6 is a flow diagram illustrating an example method of determining whether collected glare data should be communicated to surrounding vehicles while providing updated route segment analysis.

FIG. 6 illustrates a method for creating a dynamic glare analysis in which external vehicles in the network may be warned when glare is detected to be above a certain threshold in a particular area or on a particular route segment. At step 601 the glare detection server 230 receives a destination. The location or starting point of the vehicle may be input at the vehicle, or may be determined by a positioning device, such as a GPS. The glare detection system 260 may then analyze potential route segments combinations between the location and destination to determine a recommended route at step 602. In some aspects this recommended route may be based on glare exposure analysis, minimized duration of the trip, shortest distance, or analysis designed to reduce exposure to glare while minimizing trip duration as much as possible. Upon determining the recommended route, the glare detection system 260 may transmit the recommended route to the vehicle 202 and command the vehicle to perform an operation upon receiving the recommended route. In different aspects the glare detection system 260 may command the vehicle to display the recommended route on a navigation display, activate at least one autonomous operation of the vehicle, or store the recommended route at a memory in the vehicle 202. At step 603 the vehicle will activate the first sensor set 204. At step 604 the vehicle will collect glare data at the first sensor set 204 throughout the duration of the trip. In different aspects the glare data may be continuously recorded, recorded at predetermined time intervals, recorded at predetermined locations, recorded upon instruction from a user, etc.

At step 605, the computer 211 on the vehicle 202 will analyze the recorded glare data to determine if the glare factor exceeds a certain threshold. In some aspects the glare threshold may be input by a user in vehicle 202, predetermined by the glare detection system 260, or determined by other users. For example, vehicle 202 and vehicle 203 may establish a communication connection within the same network 200. In some aspects this may be based on physical proximity, such that the two vehicles are within a certain distance to each other, but may also be based on an input by either user or by the glare detection system 260. In some aspects the operator of vehicle 203 may enter a predetermined glare factor threshold into an input on vehicle 203. This threshold may be communicated to vehicle 202, and received at computer 211. In some aspects computer 211 may communicate with a plurality of vehicles to receive each vehicles threshold. In other aspects vehicle 203 and other external vehicles may communicate their glare thresholds to the glare detection system 260, which may then communicate the thresholds to vehicle 202.

At step 605, the computer 211 will determine if the glare factor detected is above the threshold. In different aspects there may be one threshold or multiple thresholds depending on how many external vehicles have communicated with vehicle 202. If the glare factor is not above the threshold, the vehicle skips to step 607. If the glare factor is above the threshold, the vehicle executes step 606 and transmits glare data to the glare detection server 230 and/or to nearby vehicles. In some aspects, such as when the threshold is determined at the glare detection system 260 and thus uniform in the network 200, the glare data will be transmitted to all nearby vehicles in the network 200. In other aspects, such as when each vehicle in the network 200 inputs its own glare threshold, the glare data will only be transferred to vehicles in the network whose glare threshold is exceed by the glare factor detected by vehicle 200. After transmitting the glare factor data, the vehicle 202 moves on to step 607, which is completing the route segment. Upon completion of the particular route segment, step 608 is whether the vehicle has arrived at the destination. If the vehicle has not arrived at the destination, the method is repeated from step 602, and the current location is used as the new starting point to determine potential route segments to the destination. If the vehicle has arrived at the destination, the method moves to step 609, and the glare data detected throughout the trip is transmitted to the glare detection server 230, where it may be analyzed by glare detection system 260 and/or stored at memory 240. It should be noted that during the method illustrated in FIG. 6, environmental data may also be collected throughout the trip and may be transmitted to the glare detection server 230 at step 609 as well.

Figure 7:
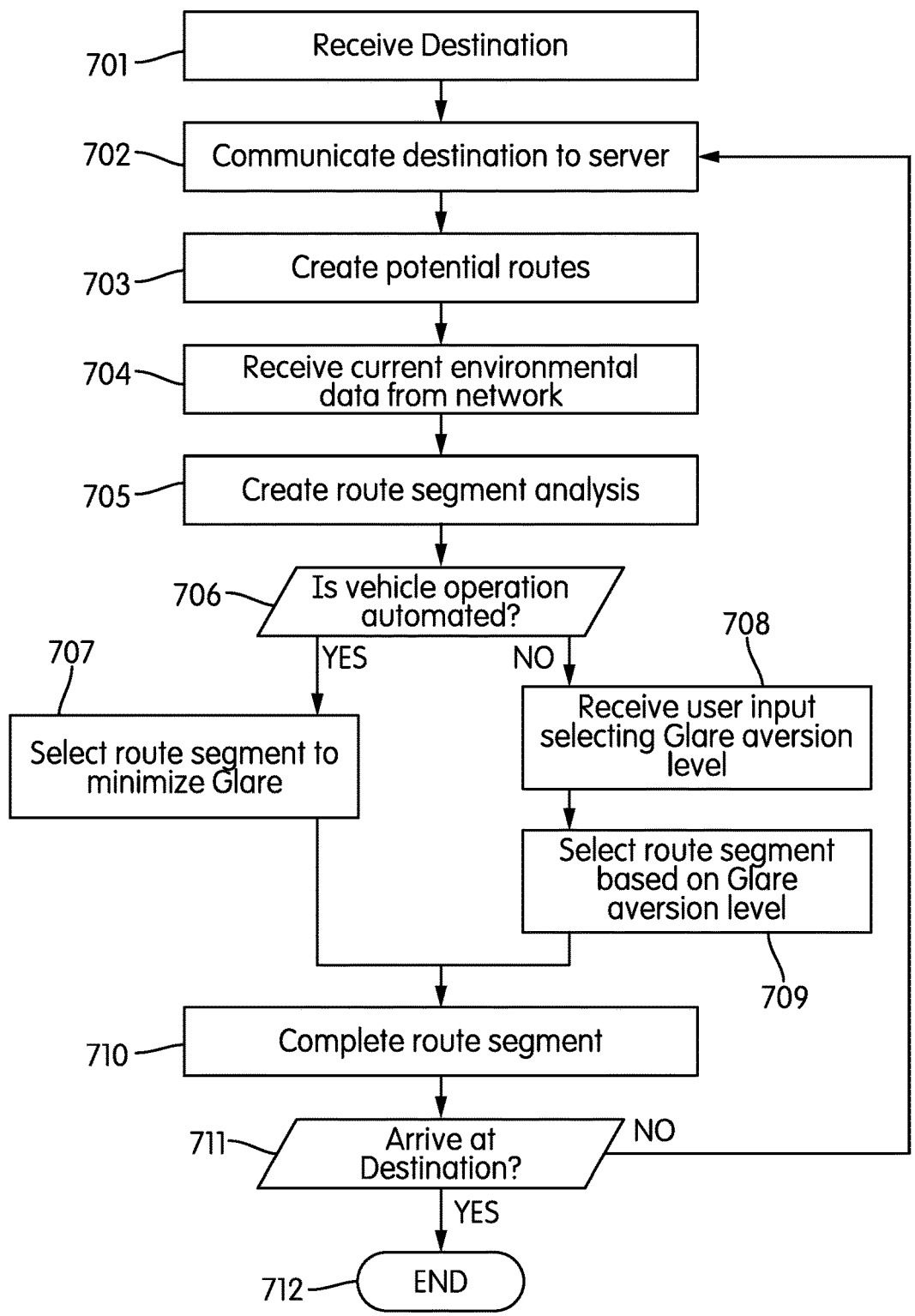
FIG. 7 is a flow diagram illustrating an example method of updating recommended route segment combinations as a vehicle travels along the route.

FIG. 7 illustrates a method of creating a dynamic route segment analysis and route determination. At step 701 the navigation system 209 will receive a destination from a user or operator. A starting point may be determined at a vehicle 202, and may include an input or the current location of the vehicle 202. This location may be input by a user or determined by a positioning device, such as GPS. The destination may be communicated to the glare detection server 230 at step 702. At step 703, the destination and starting location may be analyzed at the glare detection system 260 to determine potential routes segment combinations. At step 704 glare detection system 260 receives current environmental data from a network. The current environmental data may include data recently detected by vehicles within the network, including data relating to weather, time of day, day of week, time of year, road attributes, traffic information, geography, topography, natural structures, artificial structures, etc. The current environmental data may be received from an external database, such as an external database containing traffic data (e.g., amounts of traffic, average driving speed, traffic speed distribution, and numbers and types of accidents, etc.) at various times and locations, external weather databases containing weather data (e.g., rain, snow, sleet, and hail amounts, temperatures, wind, road conditions, visibility, etc.) at various times and locations, and other external data sources containing driving hazard data (e.g., road hazards, traffic accidents, downed trees, power outages, road construction zones, school zones, and natural disasters, etc.). In some aspects the current environmental data may be received from multiple sources, including vehicles within the network and external databases, and the server may choose one set of data to use or consolidate data from different sources to use.

Upon receiving the current environmental data, the glare detection system 260 may analyze the current environmental data with the stored glare data and stored environmental data at a memory, such as memory 240, in order to create a route segment analysis at step 705. The glare detection system 260 may then perform mathematical algorithmic analysis on the current environmental data and stored data to determine predicted current glare data based on the current environmental data. In some aspects the algorithms may determine which environmental data variables are most strongly correlated with glare data. The algorithms may then compare these environmental data variables in the current environmental data with the stored environmental data to predict current glare data based on the stored glare data associated with those environmental data variables. In different aspects the algorithm may use one environmental data variable, two variables, three variables, all variables, half the variables, one third of the variables, etc. In further aspects the analysis may include additional algorithms, functions, or analyses to further increase the accuracy of the glare factor prediction. Upon completion of the algorithmic analysis, the glare detection system 260 will assign a predicted glare factor to each individual route segment.

At step 706 the glare detection system 260 will determine if the vehicle is operated automatically. In different aspects, the operation of vehicle 202 may be fully autonomous, fully manual, or may be a mix of autonomous and manual controls. If the vehicle's operation is partly automated and partly manual, the glare analysis will treat the vehicle as either automatic or manual depending on predetermined criteria. These criteria may include what systems are automated. In some aspects the criteria may state that if a certain system or subsystem is automated, such as headlight control, braking, vehicle speed, etc., then the vehicle will be determined to be automated. If the vehicle is determined to be automatically operated, the method will proceed to step 707. In this step the glare detection system will analyze the glare information and select a route segment to minimize total glare encountered by the vehicle 202 upon the route segment. In some aspects the glare detection system will simply select the route segment with the lowest glare factor. In other aspects the glare detection system 260 will analyze all potential route segment combinations and select the next route segment that will minimize total glare encountered through the trip, or that will minimize the maximum glare factor encountered on any particular route segment within the route. In other aspects not shown, the glare detection system may perform analysis to balance duration of the trip with glare exposure to determine the next route segment. In still further aspects the glare detection system may take additional data into account in determining the route segment selection, such as reducing exposure to other traffic. The glare detection system may transmit the route segment selection to vehicle 202 and command the vehicle to perform an operation by the autonomous control system 210. In some aspects the route segment combination may be displayed on a navigation system 209 within the vehicle. Accordingly, the glare factor may be employed as a weight associated with a route segment and used when scoring and selecting potential routes. The duration, traffic, etc. associated with a route segment may also be employed as weights. An overall weight for a route segment may be determined based one or more individual weights corresponding to individual factors associated with that route segment, e.g., glare, duration, traffic, etc. For example, the overall weight for a route segment may be the average, sum, or other type of aggregation of one or more individual weights corresponding to various factors associated with that route segment. Selecting a route may thus include minimizing the sum of the overall weights associated with the route segments along a route, minimizing the sum of a particular weight (e.g., the weight corresponding to the glare factor) associated with the route segments, and the like. The method will then proceed to step 710.

If during step 706 the vehicle was determined to be manually operated, the method will proceed to step 708, and receive a user input selecting a glare factor threshold. In some aspects the glare factor threshold selected by a user may be stored in the user profile which may be stored locally at memory 206 within the vehicle 202 or remotely at the glare detection system 260, and which later may be accessed when performing glare analysis. In some aspects, this may be a maximum total glare acceptable to be experienced by a user, a maximum glare exposure acceptable to be experienced on any particular route segment, a combination of the two, or acceptable exposure to environmental variables linked to high glare factors. The user input may be dynamically selected by the user at an input in the vehicle 202, it may be predetermined by the user, it may depend on factors predetermined by a user, or be determined in any other manner. For example, in some aspects a user may be more willing to be exposed to potential glare during the middle of the day rather than at night. In this example the user may set predetermined glare factor thresholds based on the time of day. In different variations the user glare factor threshold may be predetermined by different inputs or variables. Once the glare factor threshold is received by the glare detection system 260, the system may proceed to step 709 and select a route segment based on the glare factor threshold. In some aspects the glare detection system 260 may select the shortest route segment within the glare factor threshold. In other aspects the glare detection system 260 may perform analysis on the route segment combinations and select the next route segment such that future route segment combinations are still within the glare factor threshold. In still further aspects the glare detection system may take additional data into account in determining the route segment selection, such as reducing exposure to other traffic. The route segment selection may then be communicated to the vehicle 202, where it may be displayed on a navigation system 209 to a user.

At step 710 the vehicle then completes the determined route segment. Upon completion, the method proceeds to 711, and the glare detection system 260 determines whether the vehicle 202 has arrived at its destination. If the vehicle has not arrived at its destination, the method is repeated from step 702, and the new location and destination are communicated to the glare detection server 230, such that the next route segment is selected. If the destination is reach, the method is completed at step 712. In some aspects, during the method illustrated in FIG. 7 glare data and/or environmental data may be detected and recorded by the vehicle 202 throughout its trip. If glare data and/or environmental data is detected and recorded during the trip, it may be transmitted to the glare detection system 260 at any point prior to step 712, and may be analyzed and/or stored at memory 240.

Figure 8:
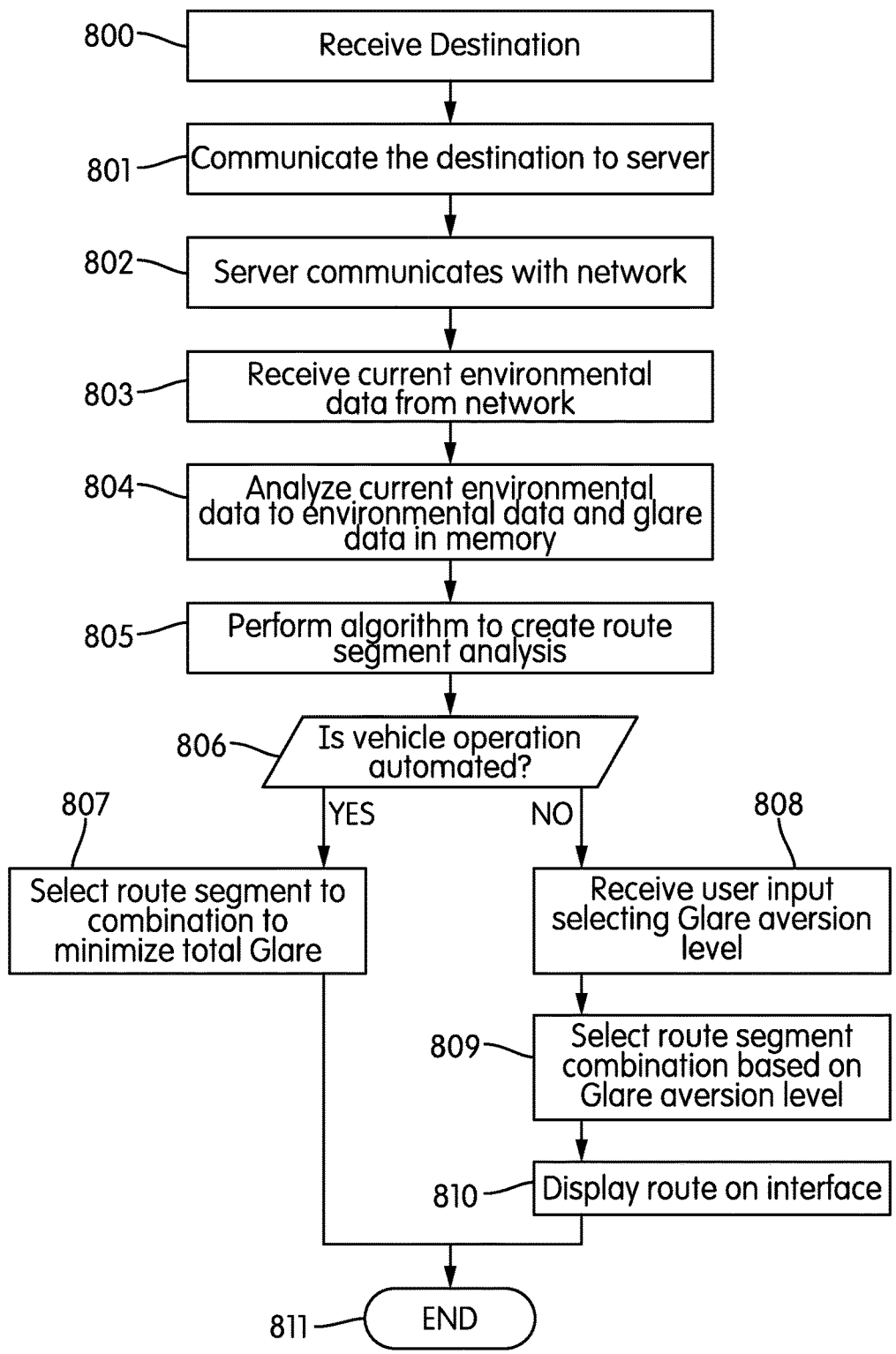
FIG. 8 is a flow diagram illustrating an example method of analyzing current environmental data with stored historical data to predict glare data to determine recommended route combinations.

FIG. 8 is a flowchart illustrating a method for selecting a recommended route based on receiving current environmental data and whether the vehicle 202 is manually operated by a user or autonomously operated by a control system 210. At step 800 the glare detection server 230 receives a destination from the vehicle 202. In some aspects the glare detection server 230 may receive a location from the vehicle 202 (e.g., from the navigation system at the vehicle), in other aspects the location may be determined by a positioning device, such as a GPS. At step 801, the destination is communicated to the glare detection system 260, where it may analyze the location and destination and determine potential route segment combinations for the vehicle to travel from the location to the destination. At step 802, the glare detection server 230 will communicate with the network 200 to receive current environmental data. At the next step 803 the server will receive the current environmental data. In some aspects, the current environmental data may include data recently detected by vehicles within the network, including data relating to weather, time of day, day of week, time of year, road attributes, traffic information, geography, topography, natural structures, artificial structures, etc. In other aspects the current environmental data may be received from an external database, such as an external database containing traffic data (e.g., amounts of traffic, average driving speed, traffic speed distribution, and numbers and types of accidents, etc.) at various times and locations, external weather databases containing weather data (e.g., rain, snow, sleet, and hail amounts, temperatures, wind, road conditions, visibility, etc.) at various times and locations, and other external data sources containing driving hazard data (e.g., road hazards, traffic accidents, downed trees, power outages, road construction zones, school zones, and natural disasters, etc.), or other external databases containing environmental data. In some aspects the current environmental data may be received from multiple sources, including vehicles within the network and external databases, and the server may choose one set of data to use or consolidate data from different sources to use.

Upon receiving the current environmental data, the glare detection system 260 will proceed to step 804 and may analyze the current environmental data with the stored glare data and stored environmental data at a memory, such as memory 240. Upon analyzing the current environmental data with the stored glare data and stored environmental data, the system proceeds to step 805 and the glare detection system 260 may then perform mathematical algorithmic analysis on the current environmental data and stored data to determine predicted current glare data based on the current environmental data. In some aspects the algorithms may determine which environmental data variables are most strongly correlated with glare data. The algorithms may then compare these environmental data variables in the current environmental data with the stored environmental data to predict current glare data based on the stored glare data associated with those environmental data variables. In different aspects the algorithm may use one environmental data variable, two variables, three variables, all variables, half the variables, one third of the variables, etc. In further aspects the analysis may include additional algorithms, functions, or analyses to further increase the accuracy of the glare factor prediction. Upon completion of the algorithmic analysis, the glare detection system 260 will assign a predicted glare factor to each individual route segment.

At step 806 the method will determine whether the vehicle 202 is autonomously operated. The glare detection system 260 will determine if the vehicle operation is automated. In some aspects the vehicle may be always automatically operated, always manually operated, or configured to switch between operation states such that the vehicle is automatically controlled at a first operation state and manually controlled at a second operation state. In further aspects the autonomous control system 210 may control all aspects of vehicular control, or only some aspects of vehicular control. Whenever some aspects of vehicular control are autonomous and some are manually controlled, the glare detection system will be preconfigured to recognize the vehicle as either autonomously or manually controlled based on which aspects are automated and which are manual.

If the vehicle is determined to be autonomously controlled, the glare detection system will proceed to step 807. The glare detection system will analyze the glare information and select a route combination to minimize total glare encountered by the vehicle upon the route. In other aspects not shown, the glare detection system may select a route combination to keep total glare exposure under a certain threshold, keep glare encountered in any particular route segment below a certain threshold, or perform analysis to balance duration of the trip with glare exposure. In still further aspects the glare detection system may take additional data into account in determining the route combination, such as reducing exposure to other traffic. The route segment combination may be transmitted to vehicle where it may be received by the autonomous control system. In some aspects the route segment combination may be displayed on a navigation system 209 within the vehicle. If the vehicle was determined to be autonomously controlled, the method will proceed from step 807 to step 811 where the method will end.

If during step 806 the vehicle was determined to be manually operated, the method will proceed to step 808, and receive a user input selecting a glare factor threshold. In some aspects, this may be a maximum total glare acceptable to be experienced by a user, a maximum glare exposure acceptable to be experienced on any particular route segment, a combination of the two, or acceptable exposure to environmental variables linked to high glare factors. The user input may be dynamically selected by the user at an input in the vehicle 202, it may be predetermined by the user, it may depend on factors predetermined by a user, or be determined in any other manner. For example, in some aspects a user may be more willing to be exposed to potential glare during the middle of the day rather than at night. In this example the user may set predetermined glare factor threshold based on the time of day. In different variations the user glare factor threshold may be predetermined by different inputs or variables. Once the glare factor threshold is received by the glare detection system 260, the system may proceed to step 809 and select a route segment combination based on the glare factor threshold. In some aspects the glare detection system 260 may select the shortest route segment combination within the glare factor threshold. In other aspects the glare detection system 260 may perform analysis on the route segment combination and select the route segment combination that provides a route determined to be the most efficient balance of duration and low glare exposure. In still further aspects the glare detection system may take additional data into account in determining the route segment combination selection, such as reducing exposure to other traffic. The route segment combination may then be communicated to the vehicle 202. The method will proceed to step 810, and display the route segment combination on the display of the navigation device 209. In some aspects the display may be accompanied by audible directions to assist the operator of the vehicle in following the route. After the route has been displayed the method proceeds to step 811 and ends. In some aspects, during the method illustrated in FIG. 8, glare data and/or environmental data may be detected and recorded by the vehicle 202 throughout its trip. If glare data and/or environmental data is detected and recorded during the trip, it may be transmitted to the glare detection system 260, e.g., prior to step 811, and analyzed and/or stored at memory 240.

Figure 9:
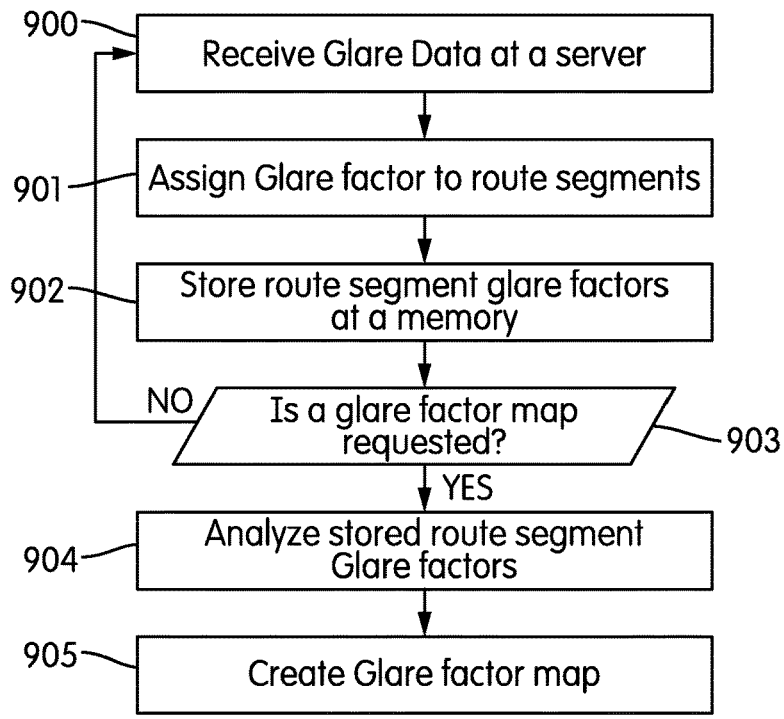
FIG. 9 is a flow diagram illustrating an example method of creating a glare factor map based on stored historical glare data.

FIG. 9 illustrates an example flowchart of creating a glare factor map. At step 900 glare data is received at a glare detection server 230. In some aspects the glare data will be received from a vehicle 202. In other aspects the glare data received will comprise glare data received from a plurality of vehicles. In some aspects glare data may be received from additional sources, such as historical databases. At the next step 901, the glare detection system 260 analyzes the glare data received by the server in comparison with predefined navigational data at the glare detection system, and assigns glare factors to individual route segments. At step 902 the route segment glare factors are stored at a memory. In some aspects the memory may be in the glare detection system, such as memory 240. In other aspects the route segment glare factors may be stored at memory outside of the network, such as an external memory not shown in FIG. 2. At the next step 903 the method asks whether a glare factor map has been requested. In some aspects the glare factor map may be requested by an input at a vehicle 202, by a computer on the network 200, or by an external server, such as a server associated with an insurance company. If a glare factor map has not been requested at step 903 the method is returned to step 900 and new glare data is received at the glare detection server 230. If a glare factor map has been requested at step 903, the method proceeds to step 904 and the glare detection system 260 analyzes the stored route segment glare factors. In this step the glare detection system 260 may use all previously stored route segment glare factors, some previously stored route segment glare factors, or any portion of the stored route segment glare factors. The glare detection system 260 may average the stored route segment glare factors or perform algorithmic analysis to determine predicted glare factors. At the next step 905 the glare detection system 260 will determine predicted glare factors, assign them to particular route segments, and create a glare factor map. In this method the more stored route segment analysis data the more accurate the glare factor map will be in predicting future glare data or accurately reflecting historical data. It should be noted that the glare factor map may be dynamically updated as additional glare data is received at the server 230 and analyzed at the system 260. In different aspects the glare factor map may display any variety of dimensions or shapes. In some aspects the glare factor map may update individual route segments more frequently, such as a route segments that experience higher traffic flow. In other aspects, once generated, the glare factor map may be transmitted to a vehicle 202, to another computer on the network 200, to an external network, or to an external server, such as a server associated with an insurance company. In further aspects, the glare detection system 260 may transmit a command to vehicle 202 based on the glare factors determined for one or more of the route segments of the map. In different aspects, based on the corresponding glare factors for one of more of the route segments, the glare detection system 260 may command the vehicle to activate or deactivate the autonomous control system, display the glare factor map on a navigational system 209, display a recommended route on the navigation system 209, store the glare factor map at a memory 206 in vehicle 202, or store a recommended route at a memory 206 in the vehicle 202. In different aspects the glare detection system 260 may transmit a command to the vehicle to perform one or multiple operations based on the determined glare factors.

Figure 10:
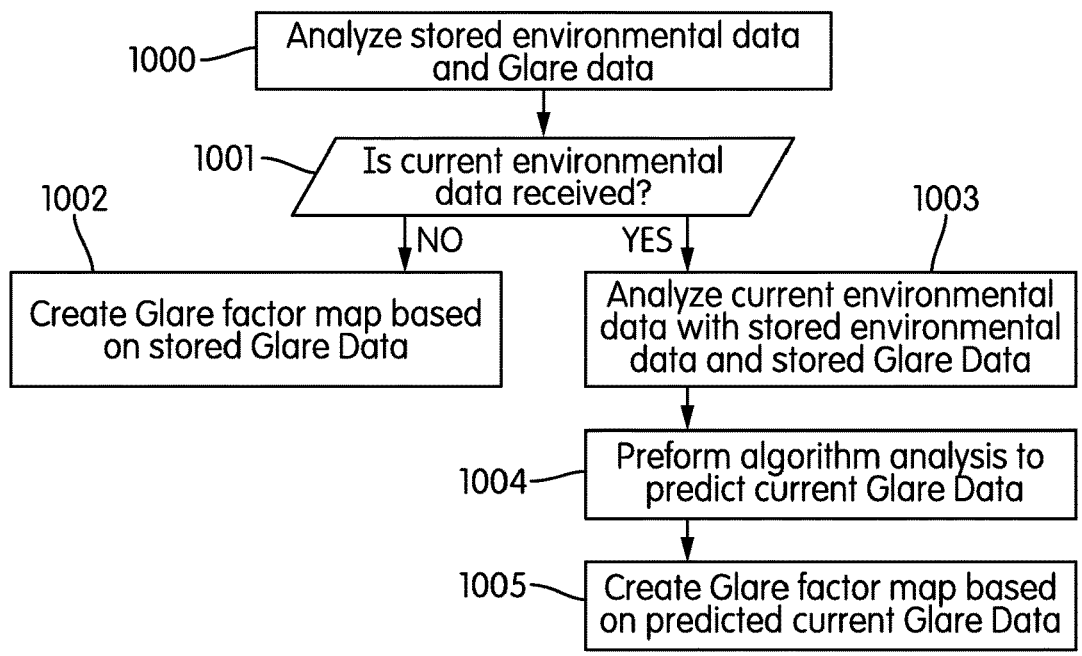
FIG. 10 is a flow diagram illustrating an example method of creating a glare factor map based on whether current environmental data is received.

FIG. 10 is a flowchart illustrating creating a glare factor map based on the type of data received at a server. In the first step 1000, the glare detection system 260 analyzes stored environmental data and glare data. This stored glare data and environmental data may be stored at a memory 240 or at an external memory and transmitted to the glare detection system. After analyzing the stored glare data and environmental data, step 1001 is determining whether current environmental data has been received. In some aspects current environmental data may include data recently detected by vehicles within the network, including data relating to weather, time of day, day of week, time of year, road attributes, traffic information, geography, topography, natural structures, artificial structures, etc. In other aspects the current environmental data may be received from an external database, such as an external database containing traffic data (e.g., amounts of traffic, average driving speed, traffic speed distribution, and numbers and types of accidents, etc.) at various times and locations, external weather databases containing weather data (e.g., rain, snow, sleet, and hail amounts, temperatures, wind, road conditions, visibility, etc.) at various times and locations, and other external data sources containing driving hazard data (e.g., road hazards, traffic accidents, downed trees, power outages, road construction zones, school zones, and natural disasters, etc.), or other external databases containing environmental data. In some aspects the current environmental data may be received from multiple sources, including vehicles within the network and external databases, and the server may choose one set of data to use or consolidate data from different sources to use. If current environmental data is not received, the method proceeds to step 1002.

At step 1002, the glare detection system creates a glare factor map based on stored glare data. The glare detection system 260 may use all previously stored glare data, some previously stored glare data, or any portion of the stored glare data. The glare detection system 260 may average the stored glare data or perform algorithmic analysis to determine predicted glare data. The glare detection system 260 may use this glare data and predefined navigational data to assign glare factors to particular route segments and create a glare factor map. In some aspects the glare factor map may then be transmitted to a vehicle 202, to other computers on the network 200, or to an external server, such one or more servers associated with an insurance company. In further aspects, the glare detection system 260 may transmit a command to vehicle 202 based on the glare factors determined for one or more of the route segments of the map. In different aspects, based on the corresponding glare factors for one of more of the route segments, the glare detection system 260 may command the vehicle to activate or deactivate the autonomous control system, display the glare factor map on a navigational system 209, display a recommended route on the navigation system 209, store the glare factor map at a memory 206 in vehicle 202, or store a recommended route at a memory 206 in the vehicle 202. In different aspects the glare detection system 260 may transmit a command to the vehicle to perform one or multiple operations based on the determined glare factors.

If current environmental data is received, the method proceeds to step 1003 and the current environmental data is analyzed with the stored glare data and environmental data. The glare detection system 260 may, at step 1004, perform mathematical algorithmic analysis on the current environmental data and stored glare and environmental data to determine predicted current glare data based on the current environmental data. In some aspects the algorithms may determine which environmental data variables are most strongly correlated with glare data. The algorithms may then compare these environmental data variables in the current environmental data with the stored environmental data to predict current glare data based on the stored glare data associated with those environmental data variables. In further aspects the analysis may include additional algorithms, functions, or analyses to further increase the accuracy of the glare factor prediction. Upon completion of the algorithmic analysis, the glare detection system 260 will assign a predicted glare factor to individual route segments within the map area. Finally, at step 1005, the glare detection system 260 may use the assigned glare factors to create a glare factor map capable of displaying all route segment combinations in a particular area and what the current predicted glare factor is for each of those route segments. This map may be used to determine recommended routes for vehicles, to display to an operator of a vehicle, or to save at a memory for future analysis. In some aspects the map may display areas or route segments as certain glare levels, such as high glare, medium glare, and low glare. In other aspects the map may show route segments as colors based on the glare factors, such as green for low or no glare, yellow for medium glare, and red for high glare. In different aspects more or different colors or displays may be used depending on the amount of detail desired on the glare factor map. In different aspects the glare factor map may be dynamically updated upon receiving new current environmental data. In some aspects this may occur at predetermined time intervals, the beginning of a new vehicle trip, or at the input of a user operator of a vehicle. In some aspects the glare factor map may then be transmitted to a vehicle 202, to other computers on the network 200, or to an external server, such one or more servers associated with an insurance company. In further aspects, the glare detection system 260 may transmit a command to vehicle 202 based on the glare factors determined for one or more of the route segments of the map. In different aspects, based on the corresponding glare factors for one of more of the route segments, the glare detection system 260 may command the vehicle to activate or deactivate the autonomous control system, display the glare factor map on a navigational system 209, display a recommended route on the navigation system 209, store the glare factor map at a memory 206 in vehicle 202, or store a recommended route at a memory 206 in the vehicle 202. In different aspects the glare detection system 260 may transmit a command to the vehicle to perform one or multiple operations based on the corresponding glare factors determined for one or more of the route segments of the glare factor map.

In some aspects data collected by the glare detection system may be used by external networks, systems, processes, and/or devices. In one example, networks and systems utilized by insurance companies may use glare analysis data in determining risk levels associated with particular aspects of vehicular operation. In one aspect, an insurance system may analyze glare analysis data in assigning a risk level to route segments based on the glare factors associated with the route segments. The insurance system may further base insurance rates in the geographic vicinity of those routes on at least the determined glare-based risk levels. A system may analyze a glare factor map or individual route segment glares factors, and compare that data to the typical routes traveled by an insurance customer as part of calculating an insurance premium for that customer based on the glare-based risks associated with traveling along those routes. In further aspects an insurance system may offer usage-based insurance wherein the insurance rates are based on anticipated levels of glare along potential routes. This may occur by allowing the user to pre-select a route at a given rate, determining that the user actually traversed the selected route, and charging the user the corresponding rate. In a different aspects, this may occur by identifying different routes and corresponding rates based on the anticipated level of glare detected along each route, determining which route the user traversed, and charging the user the rate associated with the route traversed. In further aspects, the insurance system may assign a customer a glare factor threshold that may be communicated to a glare detection system which uses the data in identifying recommended routes for that particular customer.

Additional use cases will be appreciated with the benefit of this disclosure. For example, a glare detection system residing within the vehicle may detect a current level of glare when traversing a route. If the current level of glare crosses a predetermined or user-selected glare threshold, the glare detection system may trigger one or more events at the vehicle. If, for example, the current level of glare exceeds a glare threshold selected by the driver, the glare detection system may trigger a switch between a manual operation of the vehicle's braking system to an automated operation of the vehicle's braking system. In this way, control over the speed and braking of the vehicle may be automatically transferred to an autonomous vehicle control system when the current level of glare adversely impacts the driver's ability to see other vehicles, traffic signals, etc. As another example, if the current level of glare exceeds a glare threshold selected by the driver, the glare detection system may extend or shorten the distance thresholds for an automated operation of the vehicle's braking system. In this way, control over the speed and braking distance thresholds of the vehicle may be automatically transferred to an autonomous vehicle control system when the current level of glare adversely impacts the driver's ability to see other vehicles, traffic signals, etc. As another example, if the current level of glare exceeds a glare threshold, the glare detection system at the vehicle may trigger a tinting of the windshield in order to mitigate the effects of that glare on the driver.

While the aspects described herein have been discussed with respect to specific examples including various modes of carrying out aspects of the disclosure, those skilled in the art will appreciate that there are numerous variations and permutations of the above described systems and techniques that fall within the spirit and scope of the invention.

What is claimed is:

1. A navigation apparatus for a vehicle, comprising:
   at least one processor;
   a data store storing glare data characterizing glare encountered at a plurality of routes; and,
   a memory storing computer-executable instructions that, when executed by the at least one processor, cause the navigation apparatus to:
   determine a first route associated with a first location of the vehicle;
   obtain, from the data store, a first portion of the glare data that is associated with the first route;
   determine, based on the first portion of the glare data, a glare factor for the first route; and,
   send, to the vehicle, a first command that is based on the glare factor for the first route, wherein receipt of the first command at the vehicle causes the vehicle to switch between a first operation state and a second operation state.

2. The apparatus of claim 1, wherein:
   the instructions when executed by the at least one processor, further cause the apparatus to:
   determine a second route associated with a second location of the vehicle;
   obtain, from the data store, a second portion of the glare data that is associated with the second route;
   determine, based on the second portion of the glare data, a glare factor for the second route; and,
   send, to the vehicle, a second command that is based on the glare factor for the second route.

3. The apparatus of claim 1, wherein:
   the instructions when executed by the at least one processor, further cause the apparatus to receive environmental data associated with the first route, and wherein the glare factor determined for the first route is further based on the environmental data.

4. The apparatus of claim 3, wherein the environmental data comprises at least one of weather data, traffic data, time-of-day data, day-of-the week data, topographic data, or road data.

5. The apparatus of claim 1, wherein the instructions, when executed by the at least one processor, further cause the apparatus to:
   receive new glare data characterizing glare encountered while traveling along a route;
   store, in the data store, the new glare data; and,
   update, based on the new glare data, the glare factor for the route at which the glare was encountered.

6. The apparatus of claim 5, wherein the instructions, when executed by the at least one processor, further cause the apparatus to send to the vehicle a new command that is based on the new glare data characterizing the glare encountered while traveling along the route.

7. The apparatus of claim 1, wherein the instructions, when executed by the at least one processor, further cause the apparatus to:
   receive, indication of a location and a destination;
   determine, based on the location and the destination, a plurality of possible routes from the location to the destination;
   select, based on a corresponding glare factor determined for each route of the plurality of possible routes, a recommended route from the location to the destination; and,
   indicate, to the vehicle, the recommended route.

8. The apparatus of claim 7, wherein receipt of an indication of the recommended route at the vehicle causes the vehicle to display the recommended route on a display device.

9. The apparatus of claim 7, wherein selecting the recommended route comprises comparing the corresponding glare factor to a glare factor threshold.

10. The apparatus of claim 9, wherein the glare factor threshold is received from the vehicle based on an input from a first user associated with the vehicle.

11. The apparatus of claim 1, wherein the instructions, when executed by the at least one processor, further cause the apparatus to:
    receive additional glare data and additional environmental data associated with the first route; and,
    send, to the vehicle, a new command based on at least one of the additional glare data or the additional environmental data associated with the first route.

12. The apparatus of claim 1, wherein the first operation state is an autonomous operation of the vehicle by an autonomous vehicle control system of the vehicle and the second operation state is a manual operation of the vehicle by a driver of the vehicle.

13. The apparatus of claim 12, wherein the autonomous operation of the vehicle includes automating at least one feature of vehicle operation.

14. The apparatus of claim 1, wherein the glare data characterizing glare encountered at a plurality of routes was encountered by a plurality of vehicles traveling along the plurality of routes.

15. A method of navigating a vehicle, the method comprising:
    storing, at a data store, glare data characterizing glare encountered at a plurality of routes;
    determining a first route associated with a first location of a vehicle;
    obtaining, from the data store, a first portion of the glare data that is associated with the first route;
    determining, based on the first portion of the glare data, a glare factor for the first route; and,
    sending, to the vehicle, a first command that is based on the glare factor for the first route, wherein receipt of the first command at the vehicle causes the vehicle to switch between a first operation state and a second operation state.

16. The method of claim 15, further comprising:
    receiving indication of a location and a destination;
    determining a plurality of possible routes from the location to the destination;

selecting, based on a corresponding glare factor determined for each route of the plurality of possible routes, a recommended route from the location to the destination; and, indicating, to the vehicle, the recommended route.

17. The method of claim 15, further comprising:

receiving new glare data characterizing glare encountered while traveling along a route;

storing, in the data store, the new glare data; and, updating, based on the new glare data, the glare factor for the route at which the glare was encountered.

18. The method of claim 15, further comprising:

determining a second route associated with a second location of the vehicle;

obtaining, from the data store, a second portion of the glare data that is associated with the second route;

determining, based on the second portion of the glare data, a glare factor for the second route; and, sending, to the vehicle, a second command that is based on the glare factor for the second route.

19. The method of claim 15, further comprising:

receiving additional glare data and additional environmental data associated with the first route; and, sending, to the vehicle, a new command based on at least one of the additional glare data or the additional environmental data associated with the first route.

* * * * *